(12) United States Patent
Ishikawa et al.

(10) Patent No.: US 12,120,970 B2
(45) Date of Patent: Oct. 22, 2024

(54) WORK VEHICLE AND WORK ASSISTANCE APPARATUS FOR WORK VEHICLE

(71) Applicant: KUBOTA CORPORATION, Osaka (JP)

(72) Inventors: Shinnosuke Ishikawa, Sakai (JP); Fumiya Yoshimura, Sakai (JP); Tomohiro Kinoshita, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 343 days.

(21) Appl. No.: 17/686,486

(22) Filed: Mar. 4, 2022

(65) Prior Publication Data

US 2022/0183207 A1 Jun. 16, 2022

Related U.S. Application Data

(63) Continuation of application No. PCT/JP2020/032626, filed on Aug. 28, 2020.

(30) Foreign Application Priority Data

Sep. 6, 2019 (JP) .................................. 2019-163352

(51) Int. Cl.
| | | |
|---|---|---|
| A01B 63/00 | (2006.01) | |
| A01B 63/10 | (2006.01) | |
| A01B 69/04 | (2006.01) | |

(52) U.S. Cl.
CPC ............ *A01B 63/10* (2013.01); *A01B 69/008* (2013.01)

(58) Field of Classification Search
CPC ... A01B 63/10; A01B 69/008; A01B 63/1006; G06Q 10/047; G06Q 50/02
See application file for complete search history.

(56) References Cited

U.S. PATENT DOCUMENTS

| | | | |
|---|---|---|---|
| 2009/0037041 A1 | 2/2009 | Senneff et al. | |
| 2022/0295685 A1* | 9/2022 | Matsuzaki | ............. B62D 6/007 |
| 2022/0338409 A1* | 10/2022 | Hiraki | .................. G05D 1/0282 |
| 2023/0200284 A1* | 6/2023 | Morimoto | ............ G05D 1/0219 |
| | | | 701/50 |

FOREIGN PATENT DOCUMENTS

| | | | |
|---|---|---|---|
| CN | 109716903 B | * 7/2022 | ........... A01B 69/008 |
| EP | 3104244 A1 | * 12/2016 | ........... A01B 69/008 |

(Continued)

OTHER PUBLICATIONS

Official Communication issued in corresponding Japanese Patent Application No. 2019-163352, mailed on Mar. 22, 2023.

(Continued)

*Primary Examiner* — Peter D Nolan
*Assistant Examiner* — Peter Y Ning
(74) *Attorney, Agent, or Firm* — Keating & Bennett, LLP

(57) ABSTRACT

A work vehicle includes a traveling vehicle body, a coupler capable of coupling a working device including working implements to the traveling vehicle body, an automatic operation controller configured or programmed to automatically operate the traveling vehicle body based on a planned traveling route, and a work setting controller configured or programmed to set a work start position and a work end position for the working device at different positions based on the working implements.

18 Claims, 22 Drawing Sheets

(56) References Cited

FOREIGN PATENT DOCUMENTS

| EP | 3104245 A1 | * | 12/2016 | ........... A01B 69/008 |
|----|------------|---|---------|-------------------------|
| JP | 3429151 B2 | * | 7/2003 | |
| JP | 5022486 B2 | | 9/2012 | |
| JP | 2012-235702 A | | 12/2012 | |
| JP | 2013-085495 A | | 5/2013 | |
| JP | 2016-95660 A | | 5/2016 | |
| JP | 2017-123829 A | | 7/2017 | |
| JP | 2018000039 A | * | 1/2018 | ........... A01B 69/008 |
| JP | 2019-076059 A | | 5/2019 | |
| JP | 2020103182 A | * | 7/2020 | |
| JP | 2020106975 A | * | 7/2020 | |
| JP | 2021006014 A | * | 1/2021 | |
| JP | 2021193478 A | * | 12/2021 | |
| JP | 2023126466 A | * | 9/2023 | |
| WO | WO-2020137661 A1 | * | 7/2020 | ........... A01B 59/066 |

OTHER PUBLICATIONS

Official Communication issued in International Patent Application No. PCT/JP2020/032626, mailed on Nov. 2, 2020.
Official Communication issued in corresponding European Patent Application No. 20861311.7, mailed on Sep. 1, 2023.

* cited by examiner

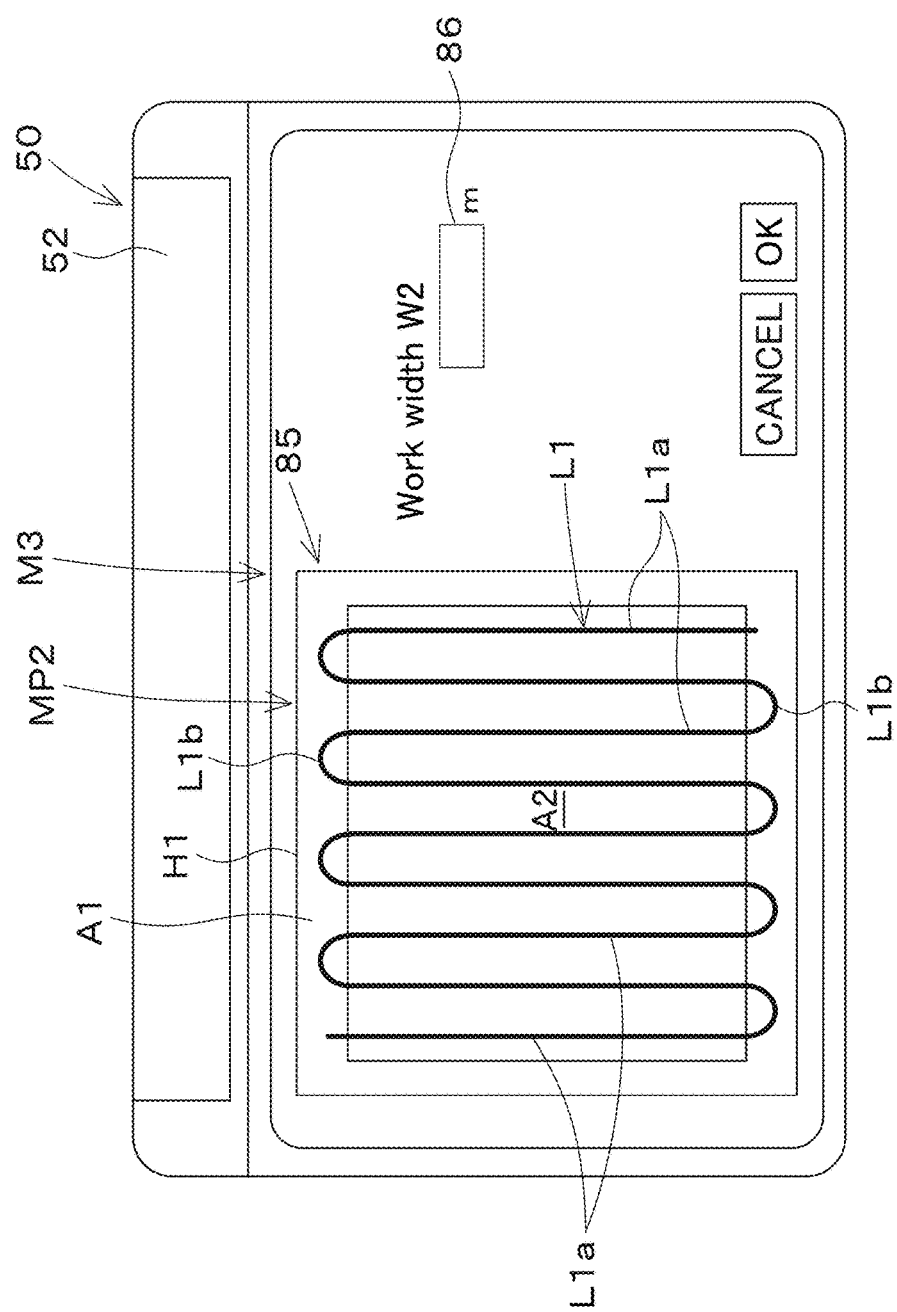

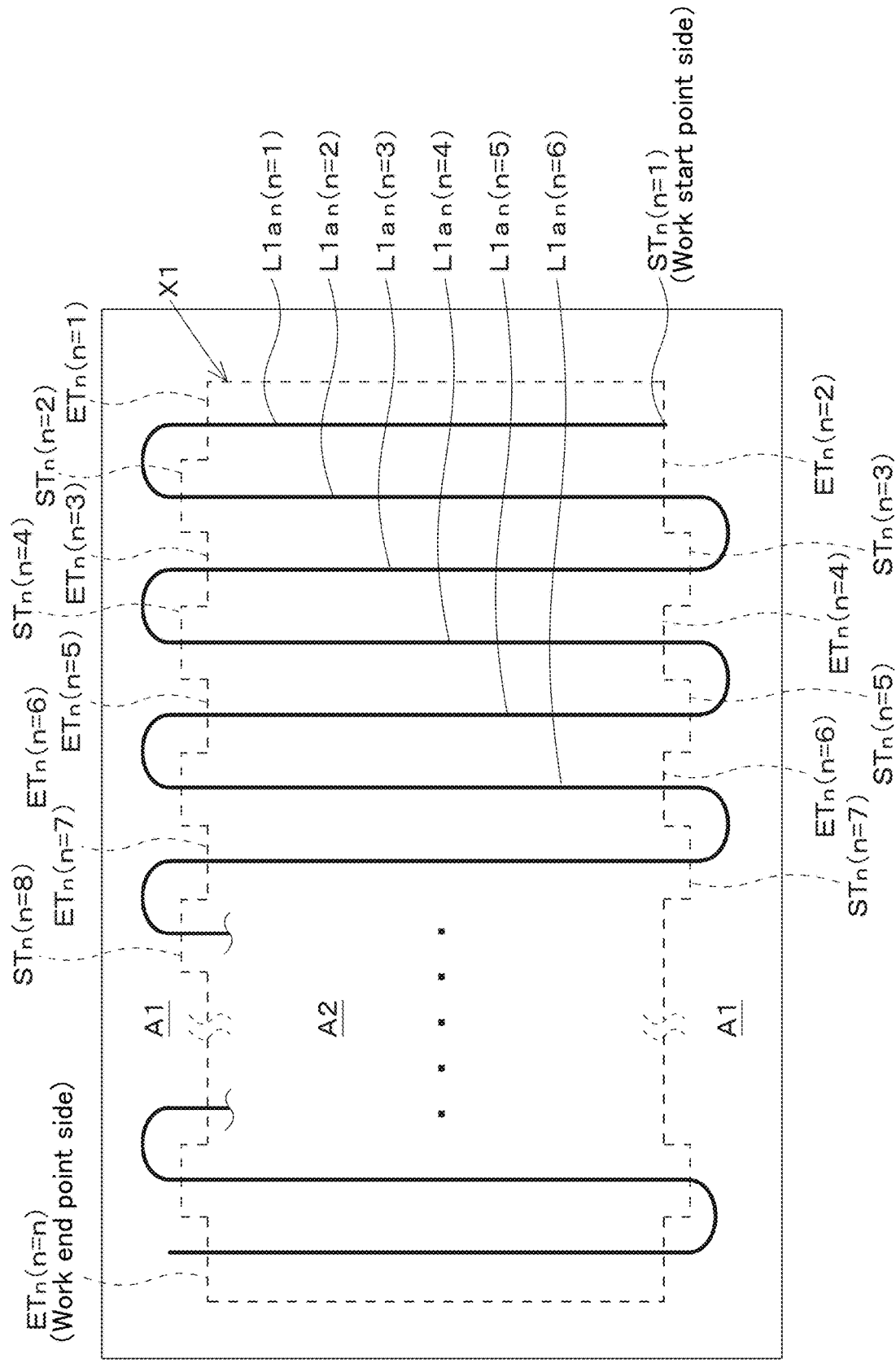

Fig.11
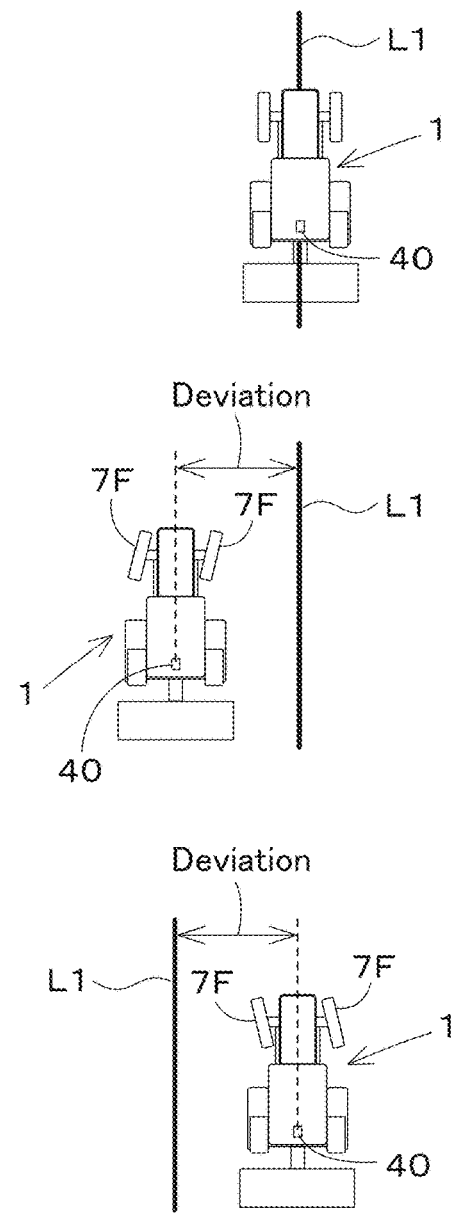
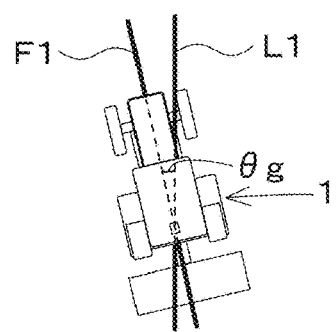

WORK VEHICLE AND WORK ASSISTANCE APPARATUS FOR WORK VEHICLE

CROSS REFERENCE TO RELATED APPLICATIONS

This application is a continuation application of International Application No. PCT/JP2020/032626, filed on Aug. 28, 2020, which claims the benefit of priority to Japanese Patent Application No. 2019-163352, filed on Sep. 6, 2019. The entire contents of each of these applications are hereby incorporated herein by reference.

BACKGROUND OF THE INVENTION

1. Field of the Invention

The present invention relates to a work vehicle, such as a tractor, and a work assistance apparatus for the work vehicle.

2. Description of the Related Art

A technique disclosed in Japanese Unexamined Patent Publication No. 2018-39 is known as a technique to create a traveling path (work traveling line) for automatically operating a work vehicle such as a tractor. A work vehicle of Japanese Unexamined Patent Publication No. 2018-39 includes an acquisition unit that acquires positional data of an outer periphery of an agricultural field, and a work setting unit that sets, in the agricultural field, a work traveling line on which a traveling machine body travels on the basis of the positional data.

SUMMARY OF THE INVENTION

In Japanese Unexamined Patent Publication No. 2018-39, the work vehicle can create the work traveling line and can perform work while automatically traveling along the work traveling line. However, there is a possibility that the work can be performed only on a part of a target agricultural field and cannot be performed on the other part thereof depending on the type of a working device.

Preferred embodiments of the present invention provide work vehicles each capable of accurately performing work at an intended location even when the work vehicle performs the work using a working device including a plurality of working implements while traveling, and provide work assistance apparatuses for the work vehicles.

A work vehicle according to a preferred embodiment of the present invention includes a traveling vehicle body; a coupler capable of coupling a working device to the traveling vehicle body, the working device including a plurality of working implements; an automatic operation controller configured or configured to automatically operate the traveling vehicle body based on a planned traveling route; and a work setting controller configured or programmed to set a work start position and a work end position for the working device at different positions based on the plurality of working implements.

The work vehicle further includes an area setting controller configured or programmed to set a work area where the working device performs work and a turning area where the traveling vehicle body turns. The work setting controller is configured or programmed to set the work start position and the work end position at a boundary between the work area and the turning area.

The work vehicle further includes a route creator configured or programmed to create the planned traveling route for the traveling vehicle body. The work setting controller is configured or programmed to set the work start position and the work end position for the working device on the planned traveling route based on the plurality of working implements.

The plurality of working implements includes a rear working implement disposed rearward in the working device, and the work setting is configured or programmed to set the work end position according to a position of the rear working implement.

The plurality of working implements includes a front working implement disposed forward in the working device, and the work setting controller is configured or programmed to set the work start position according to a position of the front working implement.

The coupler includes a lifter capable of raising and lowering the working device based on the work start position and the work end position changed by the work setting controller.

The coupler raises the working device when the working device passes the work end position, and the coupling device lowers the working device when the working device passes the work start position.

The work vehicle further includes a working device controller configured or programmed to control the working device based on the work start position and the work end position variably set by the work setting controller.

The plurality of working implements include a rear working implement disposed rearward in the working device, and the working device controller is configured or programmed to stop work by use of the rear working implement when the rear working implement passes the work end position.

The plurality of working implements include a front working implement disposed forward in the working device, and the working device controller is configured or programmed to start work by use of the front working implement when the front working implement passes the work start position.

The plurality of working implements include a front working implement disposed forward in the working device, and the work setting controller is configured or programmed to set the work start position according to a position of the front working implement. The plurality of working implements include a rear working implement disposed rearward in the working device, and the work setting controller is configured or programmed to set the work end position according to a position of the rear working implement. The working device controller is configured or programmed to start work by use of the rear working implement at a point in time when the traveling vehicle body advances a predetermined distance after the front working implement starts work at the work start position.

The plurality of working implements perform different types of work on the ground.

A work assistance apparatus for a work vehicle includes an information acquirer configured or programmed to acquire information about a plurality of working implements included in a working device coupled to a traveling vehicle body; and a work setting controller configured or programmed to set a work start position and a work end position for the working device at different positions based on the information about the plurality of working implements acquired by the information acquirer.

The work assistance apparatus for a work vehicle further includes an area setting controller configured or programmed to set a work area where the working device performs work and a turning area where the traveling vehicle body turns. The work setting controller is configured or programmed to set the work start position and the work end position at a boundary between the work area and the turning area.

A work assistance apparatus for a work vehicle includes a route creator configured or programmed to create a planned traveling route for the traveling vehicle body. The work setting controller is configured or programmed to set the work start position and the work end position for the working device on the planned traveling route based on the information about the plurality of working implements.

In the work assistance apparatus for a work vehicle, the plurality of working implements include a rear working implement disposed rearward in the working device, and the work setting controller is configured or programmed to set the work end position according to a position of the rear working implement.

The plurality of working implements include a front working implement disposed forward in the working device, and the work setting controller is configured or programmed to set the work start position according to a position of a front working implement.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 6 is a diagram illustrating an example of a route setting screen.

FIG. 9C is a diagram illustrating a state where the work start positions and the work end positions are set at the boundary.

FIG. 11 is a diagram illustrating an example of an automatic operation.

DETAILED DESCRIPTION OF THE PREFERRED EMBODIMENTS

Figure 1:
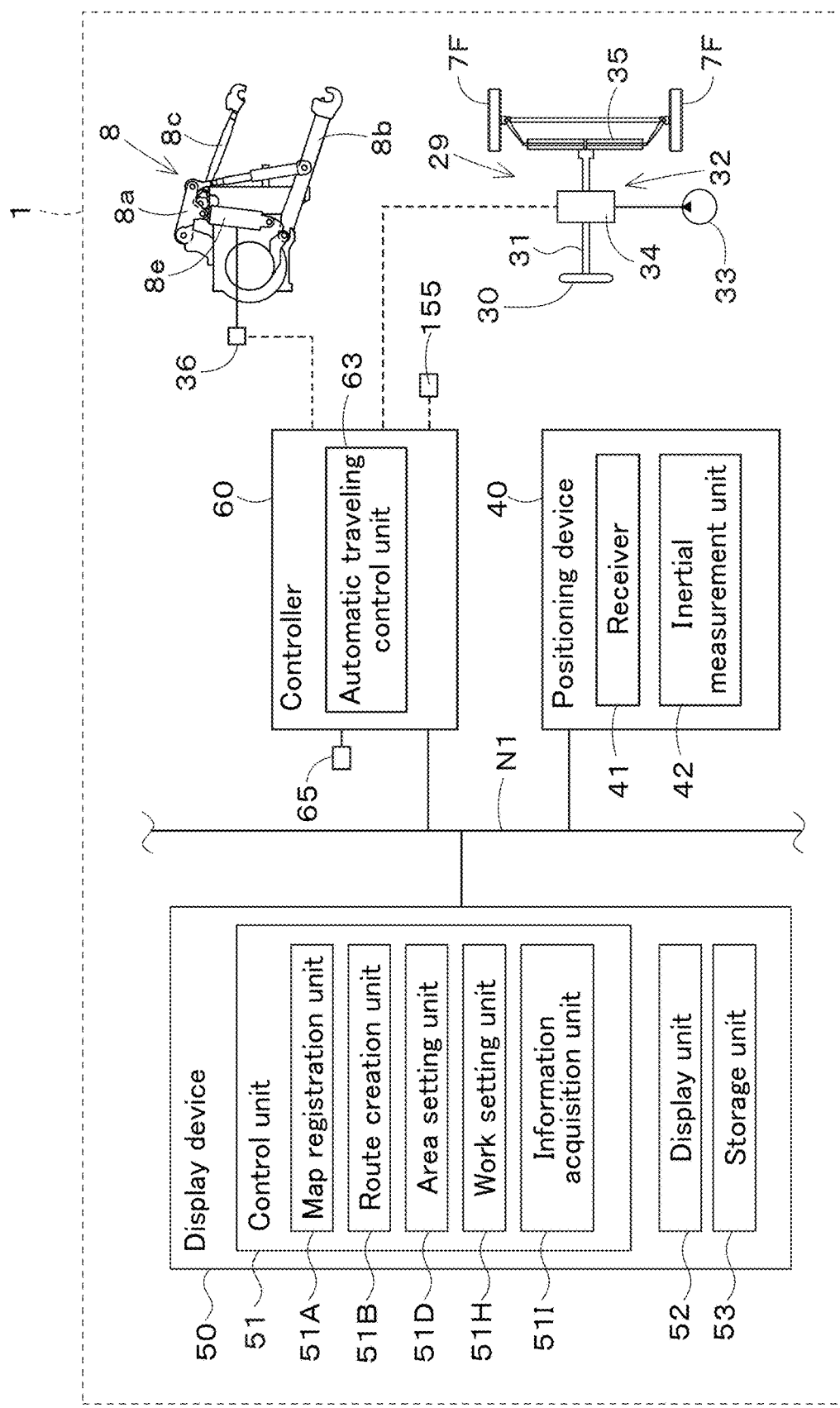
FIG. 1 is a block diagram of a work vehicle.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinbelow, preferred embodiments of the present invention will be described with reference to the drawings.

Figure 15:
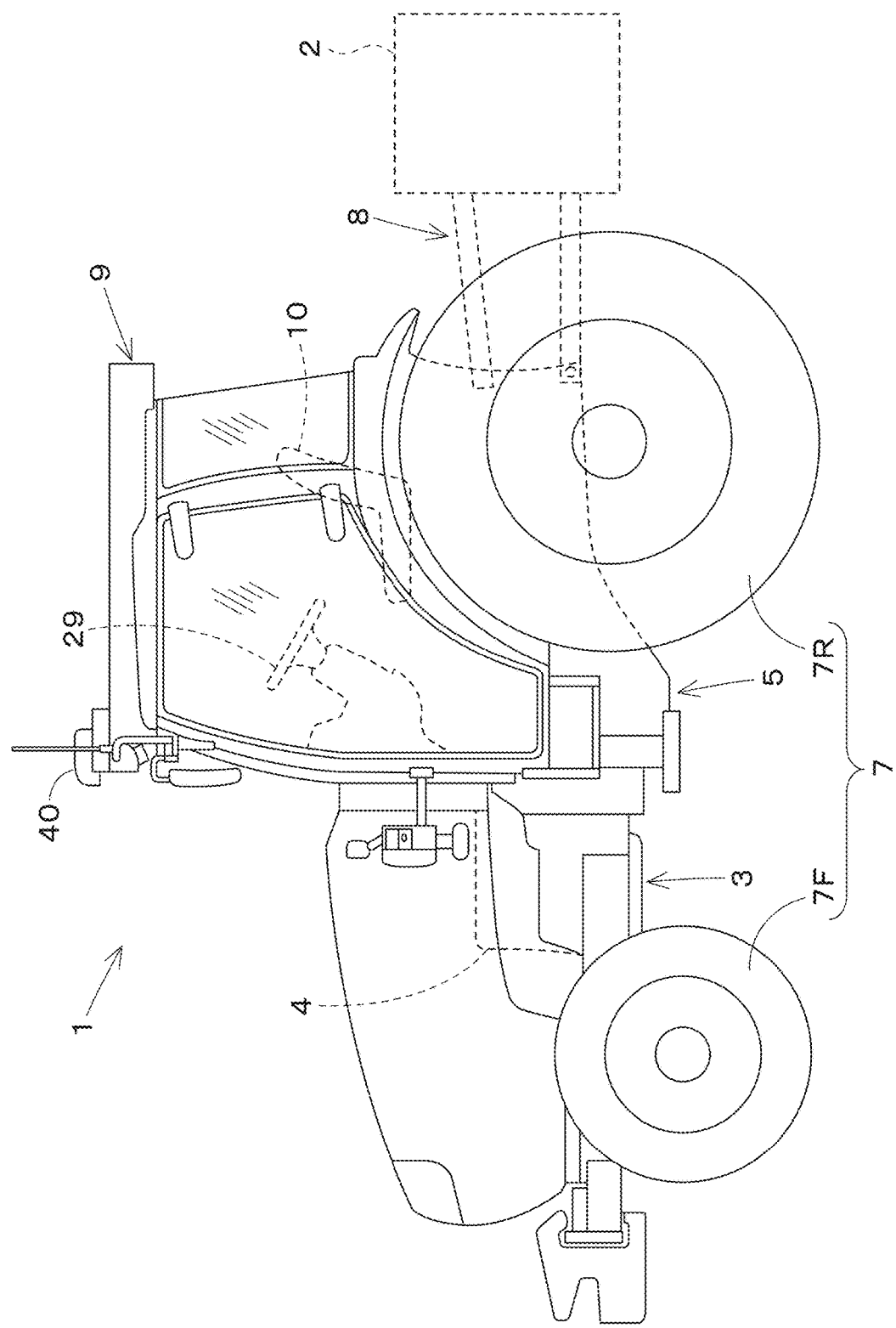
FIG. 15 is a side overall view of a tractor.

FIG. 15 illustrates a tractor 1, which is an example of a work vehicle. Although the tractor 1 will be described as an example of the work vehicle, the work vehicle is not limited to the tractor and may be a rice transplanter or a combine harvester.

As illustrated in FIG. 15, the tractor 1 includes a traveling vehicle body 3 including a traveling device 7, a prime mover 4, and a transmission 5. The traveling device 7 includes front wheels 7F and rear wheels 7R. The front wheels 7F may be tired wheels or sprockets over which crawlers are looped. Also, the rear wheels 7R may be tired wheels or sprockets over which crawlers are looped. The prime mover 4 is, for example, a diesel engine or an electric motor. The transmission 5 transmits a driving force to drive the traveling device 7 while speed-shifting the driving force and capable of switching the traveling of the traveling device 7 between forward traveling and backward traveling. The traveling vehicle body 3 is provided with a cabin 9. An operator's seat 10 is provided inside the cabin 9.

A coupling device is provided on a rear portion of the traveling vehicle body 3. The coupling device is, for example, a swing drawbar that couples a working device 2 to the traveling vehicle body 3 and does not raise and lower the working device 2 or a lifting device 8 that includes, for example, a three-point linkage mechanism and raises and lowers the working device 2. The working device 2 is detachably attached to the coupling device. The traveling vehicle body 3 can tow the working device 2 by coupling the working device 2 to the coupling device. Examples of the working device 2 include a tiller that performs tilling, a fertilizer spreader that spreads fertilizer, a transplanter that plants seedlings, an irrigation device that performs irrigation, an agricultural chemical spraying device that sprays agricultural chemicals, a seeder that scatters seeds, a mower that mows, for example, grass, a scattering device that scatters, for example, grass, a grass collecting device that collects, for example, grass, a shaping device that shapes, for example, grass, and a composite device that performs a plurality of types of work.

Figure 14:
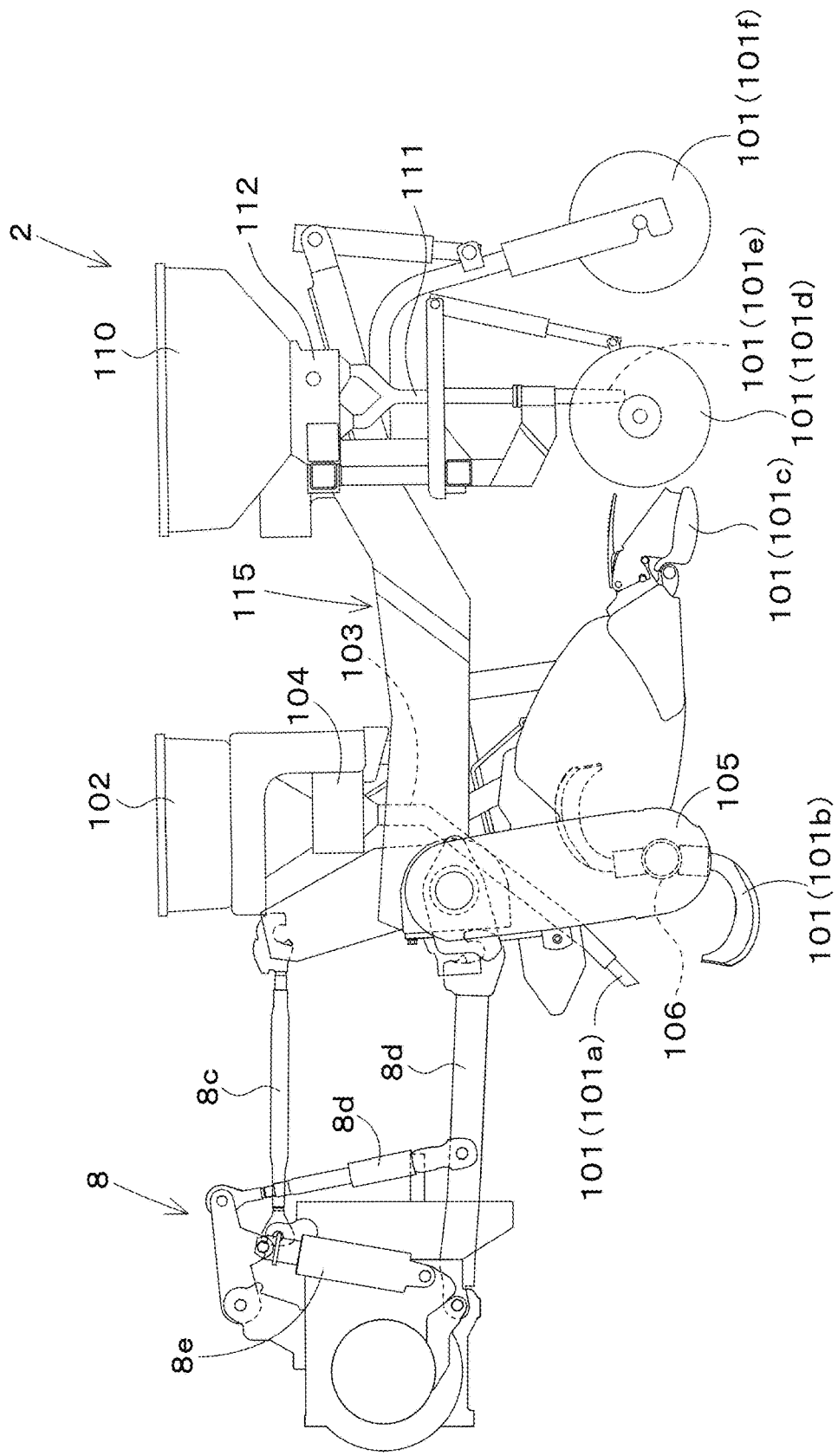
FIG. 14 is a diagram illustrating an example of a composite device.

FIG. 14 illustrates a composite device, which is an example of the working device 2. The composite device illustrated in FIG. 14 includes a plurality of working parts 101. The plurality of working parts 101 include a first working part 101a, a second working part 101b, a third working part 101c, a fourth working part 101d, a fifth working part 101e, and a sixth working part 101f. The first working part 101a, the second working part 101b, the third working part 101c, the fourth working part 101d, the fifth working part 101e, and the sixth working part 101f are arranged in this order from the front side to the rear side. The first working part 101a is located on the frontmost side. The sixth working part 101f is located on the rearmost side.

The first working part 101a is a fertilizer spreading nozzle that spreads or sprays a fertilizer charged into a container 102. The first working part 101a is connected, through a hose 103, to a feeder 104 that feeds the fertilizer inside the container 102. The first working part 101a sprays, onto an agricultural field (ground), the fertilizer fed to the hose 103 by driving the feeder 104. The second working part 101b is a tilling tine that tills the agricultural field. The second working part 101b is attached to a rotation shaft 106 rotatable by a driving mechanism 105. The second working part 101b rotates along with rotation of the rotation shaft 106 to tilt the agricultural field by driving the driving mechanism 105. The third working part 101c is a ground leveling cover disposed rearward of the second working part 101b. The third working part 101c levels the tilled ground. In the case of the composite device illustrated in FIG. 14, the first working part 101a, the second working part 101b, and the third working part 101c constitute the fertilizer spreader.

The fourth working part 101d is a groove forming disc that forms a groove. The fifth working part 101e is a seeding nozzle that sows seeds charged into a container 110. The fifth working part 101e is connected, through a hose 111, to a feeder 112 that feeds the seeds inside the container 110. The fifth working part 101e sows the seeds fed to the hose 111 by driving the feeder 112 into the groove formed by the fourth working part 101d. The sixth working part 101f is a compacting roller that is rotatably supported and compacts at least a part with the seeds sowed therein. In the case of the composite device illustrated in FIG. 14, the fourth working part 101d, the fifth working part 101e, and the sixth working part 101f constitute the seeder.

The first working part 101a, the second working part 101b, the third working part 101c, the fourth working part 101d, the fifth working part 101e, and the sixth working part 101f are supported by a frame 115, and raised or lowered by the lifting device 8. That is, the fertilizer spreader and the seeder include the frame 115 and are supported by a lift arm 8a, a lower linkage 8b, a top linkage 8c, a lift rod 8d, and a lift cylinder 8e illustrated in FIG. 2 so as to be raised and lowered. The feeder 104, the driving mechanism 105, and the feeder 112 are driven (operated) by rotation of a PTO shaft projecting from the rear portion of the traveling vehicle body 3.

Figure 2:
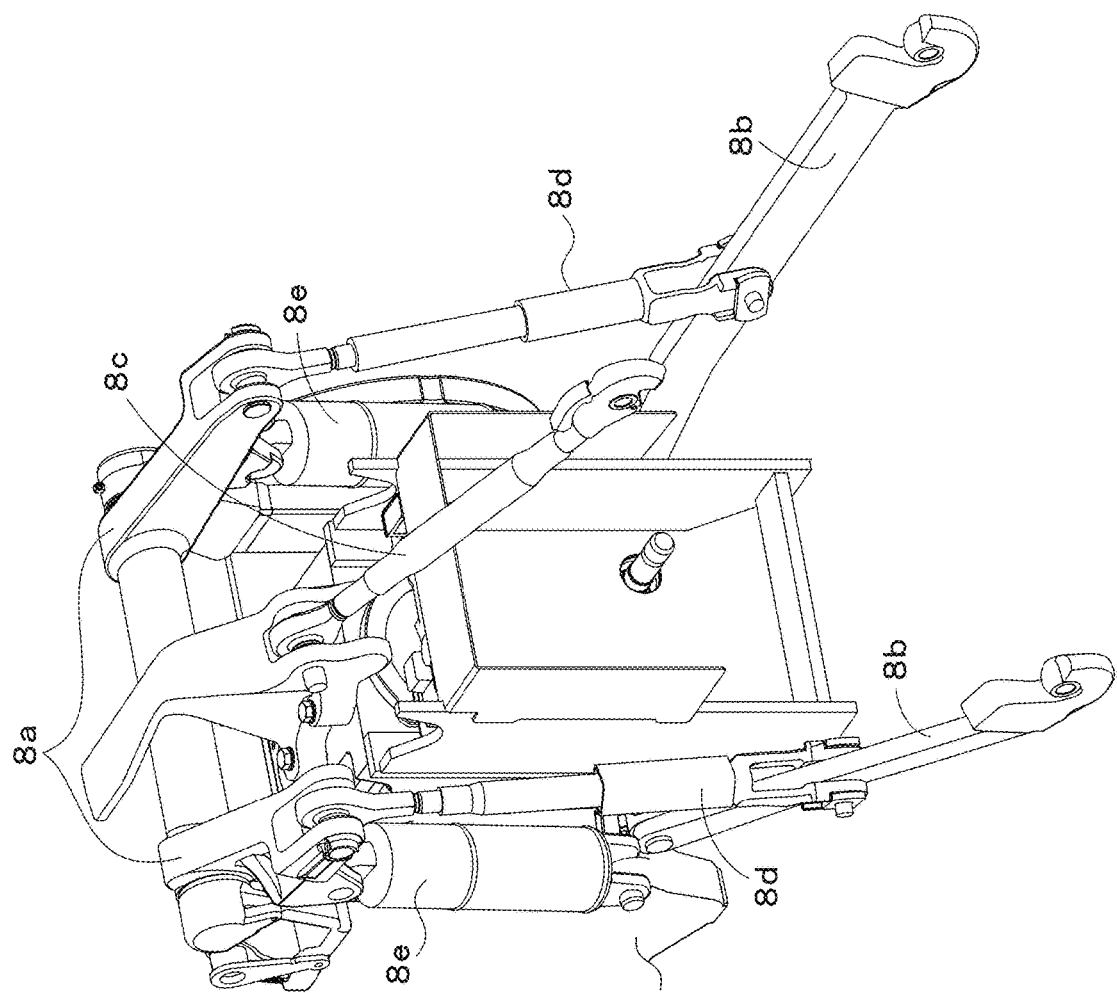
FIG. 2 is a diagram illustrating a lifting device.

As illustrated in FIG. 2, the lifting device 8 includes the lift arm 8a, the lower linkage 8b, the top linkage 8c, the lift rod 8d, and the lift cylinder 8e. A front end portion of the lift arm 8a is supported swingably upward or downward on a rear upper portion of a case (transmission case) in which the transmission 5 is housed. The lift arm 8a swings (rises and lowers) by driving of the lift cylinder 8e. The lift cylinder 8e is a hydraulic cylinder. The lift cylinder 8e is connected to a hydraulic pump through a control valve 36. The control valve 36 is a solenoid valve. The control valve 36 extends and contracts the lift cylinder 8e.

A front end portion of the lower linkage 8b is supported swingably upward or downward on a rear lower portion of the transmission 5. A front end portion of the top linkage 8c is supported swingably upward or downward on a rear portion of the transmission 5 above the lower linkage 8b. The lift rod 8d couples the lift arm 8a and the lower linkage 8b to each other. The working device 2 is coupled to a rear portion of the lower linkage 8b and a rear portion of the top linkage 8c. When the lift cylinder 8e is driven (extended or contracted), the lift arm 8a rises or lowers, and the lower linkage 8b coupled to the lift arm 8a through the lift rod 8d rises or lowers. Accordingly, the working device 2 swings upward or downward (lifts or lowers) about a front portion of the lower linkage 8b serving as a fulcrum.

As illustrated in FIG. 1, the tractor 1 includes a steering device 29. The steering device 29 includes a steering wheel 30, a rotation shaft (steering shaft) 31 rotatable along with rotation of the steering wheel 30, and an assist mechanism (power steering mechanism) 32 that assists steering of the steering wheel 30. The assist mechanism 32 incudes a hydraulic pump 33, a control valve 34 to which a hydraulic fluid ejected from the hydraulic pump 33 is supplied, and a steering cylinder 35 operable by the control valve 34. The control valve 34 is a solenoid valve operable in accordance with a control signal. The control vale 34 is, for example, a 3-position switching valve switchable by, for example, movement of a spool. The control valve 34 is also switchable by steering of the steering shaft 31. The steering cylinder 35 is connected to an arm (knuckle arm) for changing the direction of the front wheels 7F.

Thus, when the steering wheel 30 is operated, a switching position and an opening degree of the control valve 34 are switched in response to the operation of the steering wheel 30, and the steering cylinder 35 extends or contracts leftward or rightward according to the switching position and the opening degree of the control valve 34. Accordingly, a steering direction of the front wheels 7F can be changed. The steering device 29 described above is merely an example, and the configuration of the steering device 29 is not limited to the above-described configuration.

The tractor 1 includes a positioning device 40. The positioning device 40 is capable of detecting its own position (positioning information including its latitude and longitude) using a satellite positioning system (positioning satellite) such as the D-GPS, the GPS, the GLONASS, the BeiDou, the Galileo, or the QZSS. That is, the positioning device 40 receives a satellite signal (e.g., a position of the positioning satellite, a transmission time, or correction information) transmitted from the positioning satellite and detects the position (e.g., the latitude and longitude) of the tractor 1, that is, the vehicle body position on the basis of the satellite signal. The positioning device 40 includes a receiver 41 and an inertial measurement unit (IMU) 42. The receiver 41 includes, for example, an antenna and receives a satellite signal transmitted from the positioning satellite. The receiver 41 is attached to the traveling vehicle body 3 separately from the inertial measurement unit 42. In the present preferred embodiment, the receiver 41 is attached to the traveling vehicle body 3, specifically, to the cabin 9. An attached location of the receiver 41 is not limited to the location in the present preferred embodiment.

The inertial measurement unit 42 includes, for example, an acceleration sensor that detects an acceleration or a gyroscopic sensor that detects an angular velocity. The inertial measurement unit 42 is provided under the traveling vehicle body 3, for example, under the operator's seat 10 and can detect roll, pitch, and yaw angles of the traveling vehicle body 3.

As illustrated in FIG. 1, the tractor 1 includes a display device 50. The display device 50 includes a control unit 51, a display unit 52, and a storage unit 53. The control unit 51 may include, for example, a CPU or an electric or electronic circuit and performs various control operations related to the display device 50. The display unit 52 may include, for example, a liquid crystal panel, a touch panel, or another panel and display various pieces of information. The storage unit 53 may include, for example, a nonvolatile memory. For example, an application program for assisting work of the tractor 1 is stored in the storage unit 53. When the application program is started, the display device 50 functions as a work assistance apparatus that assists work. Also when the display device 50 functions as the work assistance apparatus, the control unit 51, which is hardware, executes a process as the work assistance apparatus.

Figure 3:
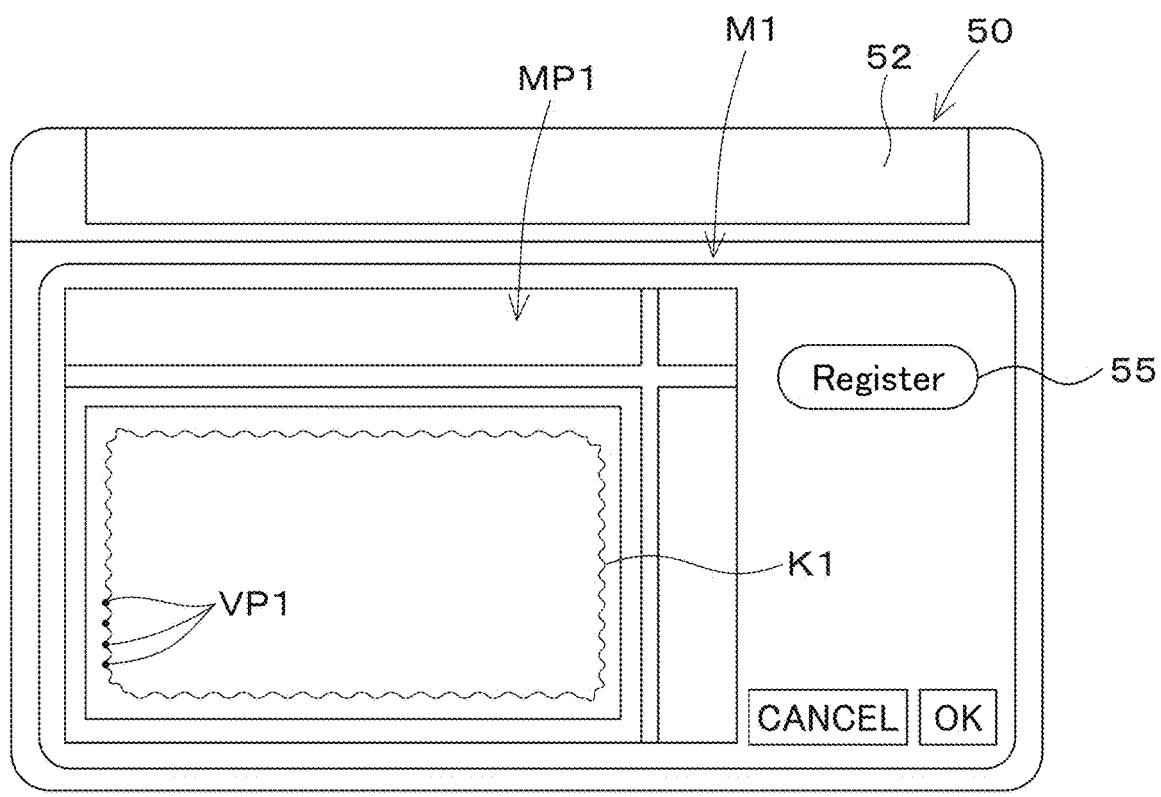
FIG. 3 is a diagram illustrating an example of a map registration screen.

As illustrated in FIG. 1, the display device (work assistance apparatus) 50 includes a map registration unit 51A. The map registration unit 51A registers an outline of a predetermined agricultural field, for example, a position corresponding to the outline of the predetermined agricultural field. As illustrated in FIG. 3, when a predetermined operation is performed on the display device 50, the map registration unit 51A displays a map registration screen M1 on the display unit 52.

Figure 4A:
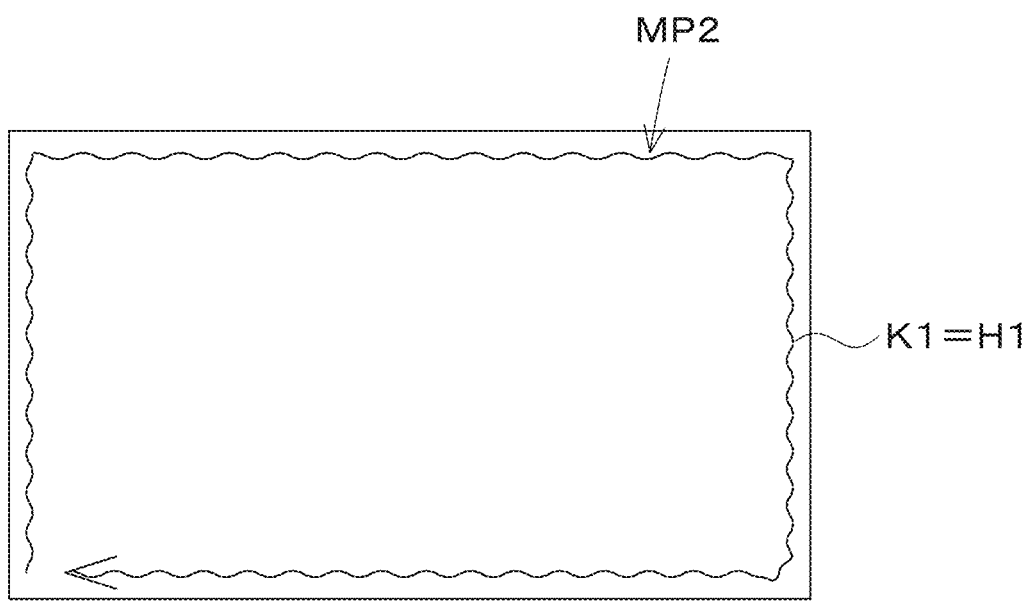
FIG. 4A is a diagram illustrating obtaining an outline of an agricultural field (agricultural map) from a traveling track.

A map MP1 including an agricultural field, a vehicle body position VP1 of the tractor 1, and agricultural field identification information such as an agricultural field name or an agricultural field management number are displayed on the map registration screen M1. Positional information such as the latitude and longitude is associated, in addition to image data representing the agricultural field, with the map MP1. When the tractor 1 enters the agricultural field and circles around inside the agricultural field, the current vehicle body position VP1 detected by the positioning device 40 when the tractor 1 circles around is displayed on the map registration screen M1. When a registration button 55 displayed on the map registration screen M1 is selected after the tractor 1 finishes circling around inside the agricultural field, as illustrated in FIG. 4A, the map registration unit 51A sets, as an outline (outer shape) H1 of the agricultural field, a traveling track K1 obtained from a plurality of vehicle body positions of the tractor 1 circling around and registers an agricultural field map MP2 indicated by the outline H1 together with the agricultural field identification information.

Figure 4B:
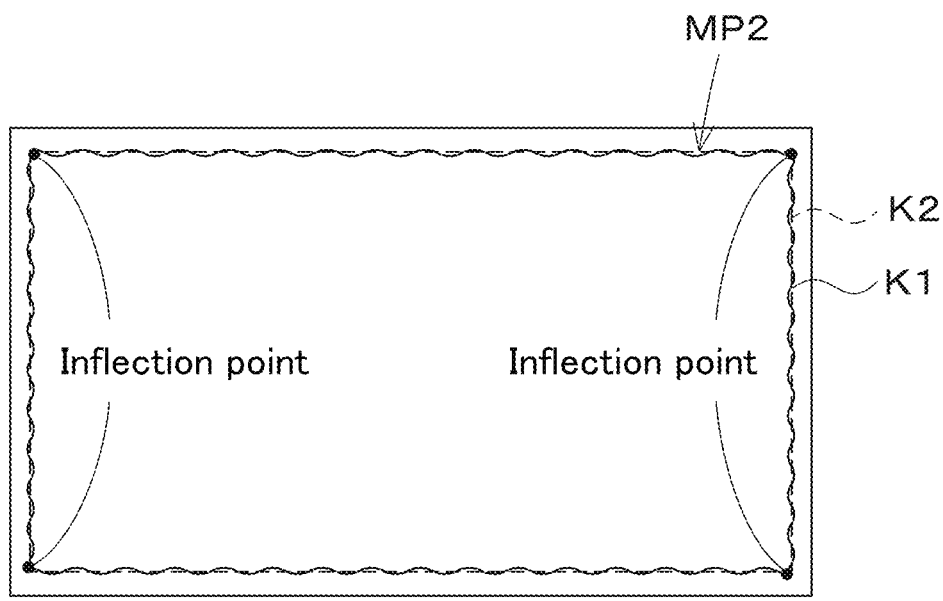
FIG. 4B is a diagram illustrating obtaining the outline of the agricultural field (agricultural map) from inflection points of the traveling track.
Figure 4C:
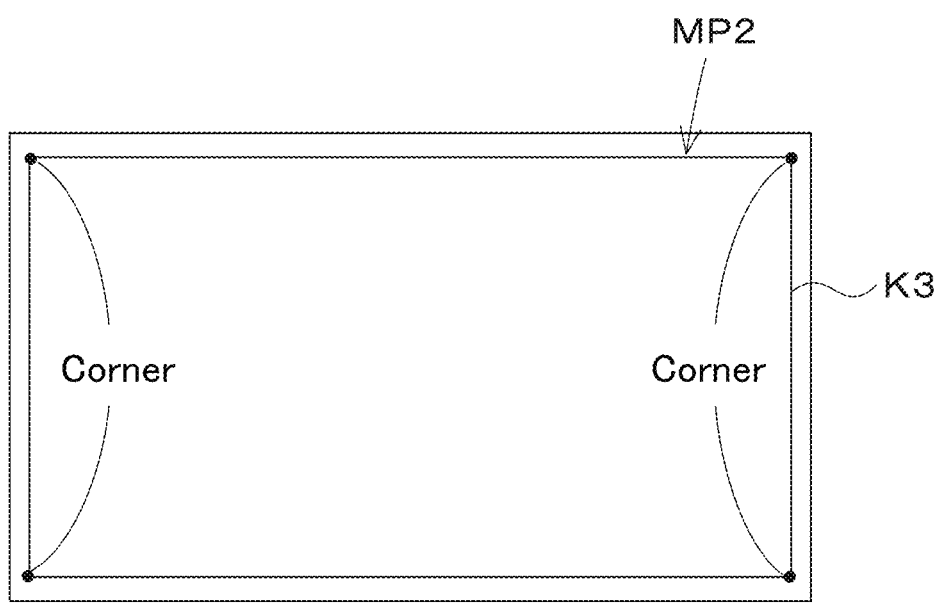
FIG. 4C is a diagram illustrating obtaining the outline (agricultural map) by a switch operation during traveling.

Alternatively, as illustrated in FIG. 4B, the map registration unit 51A may register, as the outline H1 of the agricultural field (agricultural field map MP2), an outline K2 connecting inflection points calculated from the traveling track indicated by the vehicle body positions VP1. As illustrated in FIG. 4C, the map registration unit 51A may register, as the outline H1 (agricultural field map MP2), an outline K3 connecting corners of the agricultural field designated by, for example, a driver using a switch provided on the tractor 1 when the tractor 1 circles around. The agricultural field registration methods described above are merely examples, and the registration method is not limited thereto.

The outline of the agricultural field, that is, the agricultural field map MP2 may be data indicated by a position (latitude and longitude), data indicated by a coordinate system (X and Y axes), or data indicated by another expression.

The storage unit 53 stores the agricultural field map MP2 indicating the outline (outer shape) registered by the map registration unit 51A. That is, the storage unit 53 stores the agricultural field map MP2, that is, data indicating the outline of the agricultural field (data for representing a specified agricultural field).

As illustrated in FIG. 1, the display device (work assistance apparatus) 50 includes an area setting unit 51D. The area setting unit 51D sets a work area A2.

Figure 5:
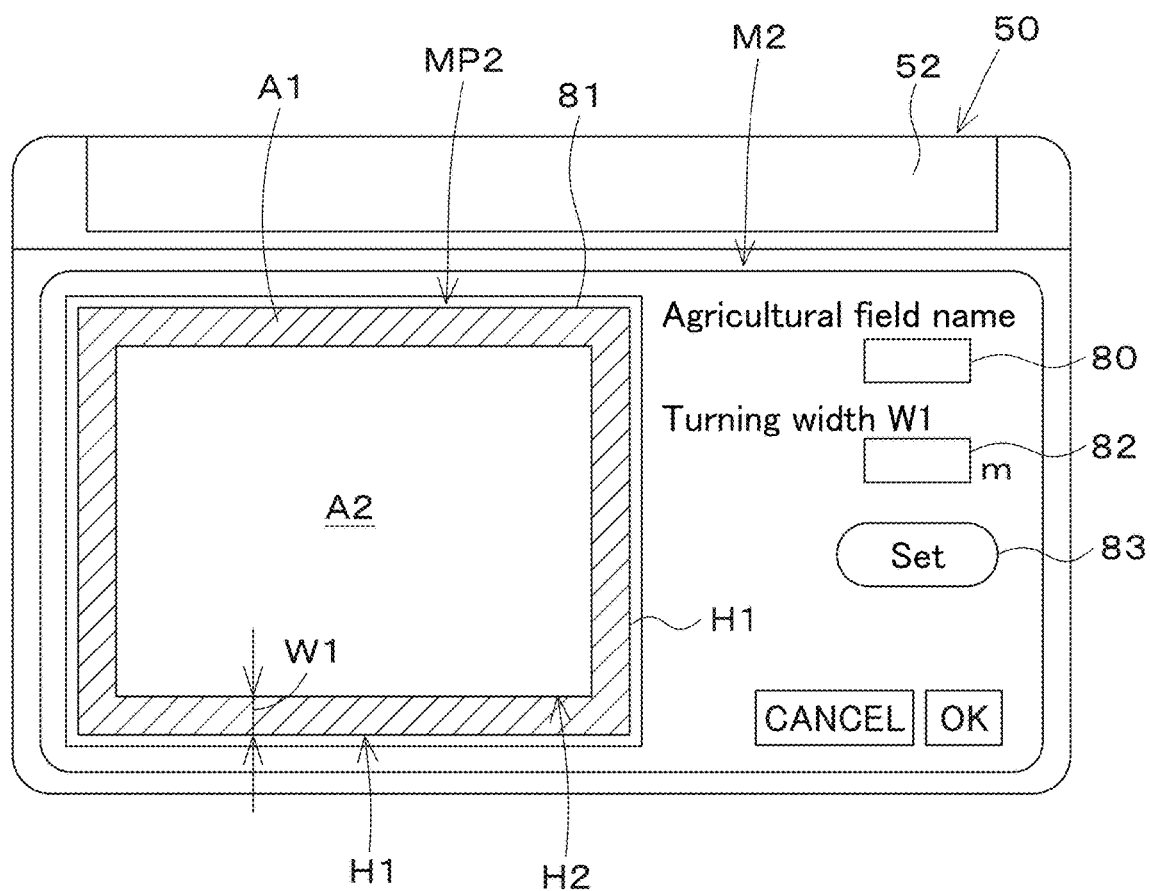
FIG. 5 is a diagram illustrating an example of a work setting screen.

As illustrated in FIG. 5, when an operator (driver) performs a predetermined operation on the display device, the area setting unit 51D displays a work setting screen M2 on the display unit 52. The work setting screen M2 includes an agricultural field input portion 80 and an agricultural field display portion 81. Agricultural field identification information such as the agricultural field name or the agricultural field management number can be input to the agricultural field input portion 80. The agricultural field display portion 81 displays the agricultural field map MP2 indicating a predetermined agricultural field corresponding to the agricultural field identification information input to the agricultural field input portion 80. That is, the area setting unit 51D invokes, from the storage unit 53, the agricultural field map MP2 corresponding to the agricultural field identification information input to the agricultural field input portion 80 and displays, on the agricultural field display portion 81, the agricultural field map MP2 transmitted from the storage unit 53.

On the agricultural field map MP2, when a turning width W1 is input to a turning width input portion 82 and a turning setting button 83 is selected, the area setting unit 51D displays the work area A2 except a turning area A1 on the agricultural field map MP2 displayed on the agricultural field display portion 81. For example, the area setting unit 51D sets, as the work area A2, an area surrounded by an outline H2 that is offset inward by the turning width W1 from the outline H1 of the agricultural field map MP2. On the work setting screen M2, the work area A2 may be set on the agricultural field map MP2 displayed on the agricultural field display portion 81 by designating the position of the outline of the work area A2 on the agricultural field map MP2 using, for example, a pointer.

The storage unit 53 stores data of the agricultural field map MP2 with the work area A2 set thereon (data indicating the position of the work area A2).

As illustrated in FIG. 1, the display device (work assistance apparatus) 50 includes a route creation unit 51B. The route creation unit 51B refers to the agricultural map MP2 registered in the storage unit 53 and creates a traveling route (planned traveling route) L1 for the traveling vehicle body 3 on the agricultural field map MP2.

As illustrated in FIG. 6, when an operator (driver) performs a predetermined operation on the display device, the route creation unit 51B displays a route setting screen M3 on the display unit 52. On the route setting screen M3, the planned traveling route L1 can be set at least in the work area A2 in the agricultural field. The route setting screen M3 includes a route display portion 85 that displays the planned traveling route L1 and a width input portion 86. A work width W2 of the working device 2 is a width (a work execution width) by which the working device 2 performs work on the ground such as an agricultural field. In the case where the working device 2 spreads the material onto the agricultural field, the work width W2 is a spreading width by which the material is supplied. For example, in a case where the working device 2 is a fertilizer spreader, a fertilizer spreading width corresponds to the work width W2. In a case where the working device 2 is a chemical spraying device, a chemical spraying width corresponds to the work width W2. In a case where the working device 2 is a seedling transplanter, a planting width by which seedlings can be planted into the agricultural field in one operation cycle corresponds to the work width. In a case where the working device 2 is a seeder, a seeding width corresponds to the work width W2. Ground work means agricultural work performed on an agricultural field and a crop planted on the agricultural field. Examples of the ground work include seedling planting, irrigation, chemical spraying, fertilizer spreading (fertilizer application), scattering of seeds (seeding), compaction, soil covering, ridge forming, tilling, and groove forming.

Figure 7A:
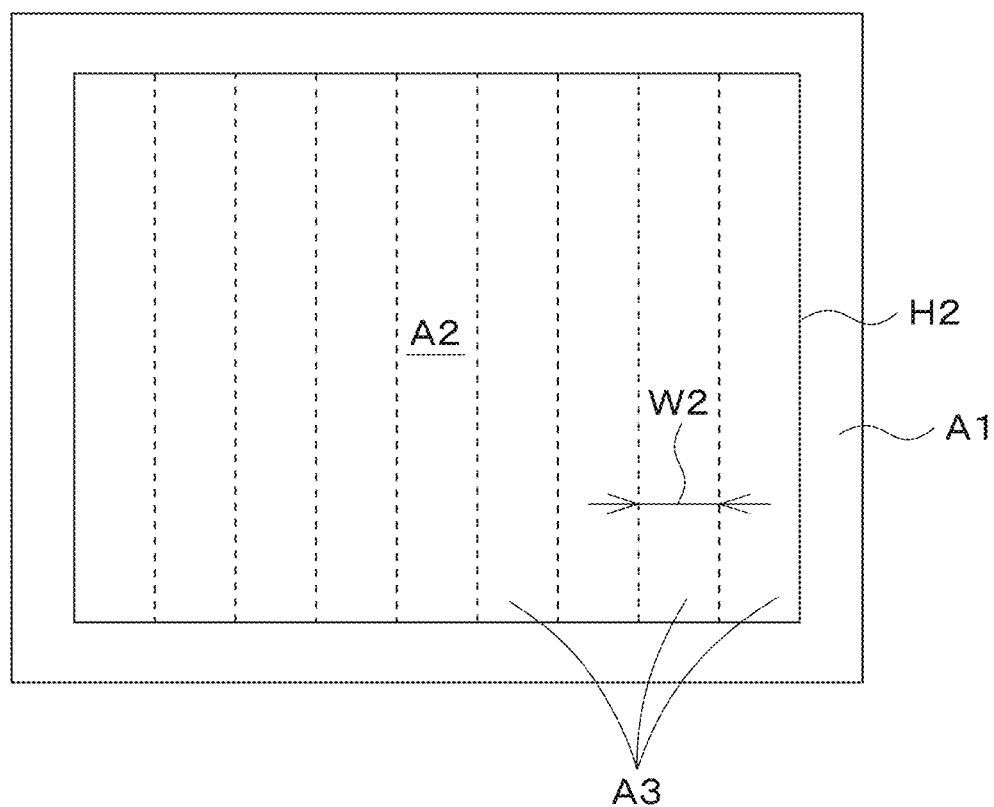
FIG. 7A is a diagram illustrating a unit work section created on a work area.
Figure 7B:
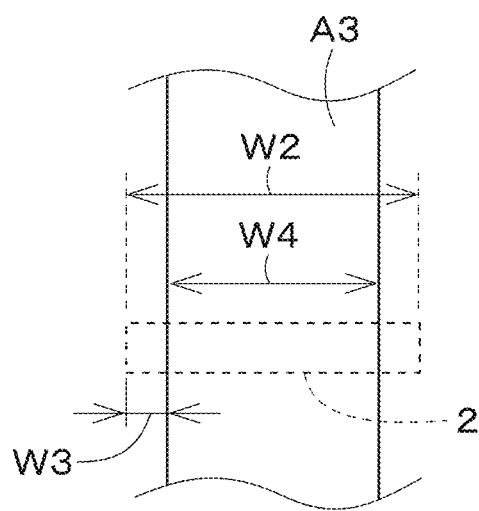
FIG. 7B is a diagram illustrating a unit work section different from that in FIG. 7A.

When the route creation unit 51B acquires the work width W2, as illustrated in FIG. 7A, the route creation unit 51B divides the work area A2 with the work width W2 in the longitudinal or lateral direction to create, inside the work area A2, a plurality of unit work sections A3 where the working device 2 performs the work. That is, the route creation unit 51B creates, inside the work area A2, the plurality of unit work sections A3 each having the same width as the work width W2. As illustrated in FIG. 7B, the route creation unit 51B may create, inside the work area A2, a plurality of unit work sections A3 each having a width W4 obtained by subtracting an overlap width W3 from the work width W2. The overlap width W3 can be input on the route setting screen M3. That is, the route creation unit 51B sets, as the unit work section A3, a minimum unit area where the working device 2 performs the work on the agricultural field when the traveling vehicle body 3 with the working device 2 coupled thereto is caused to travel.

Figure 8:
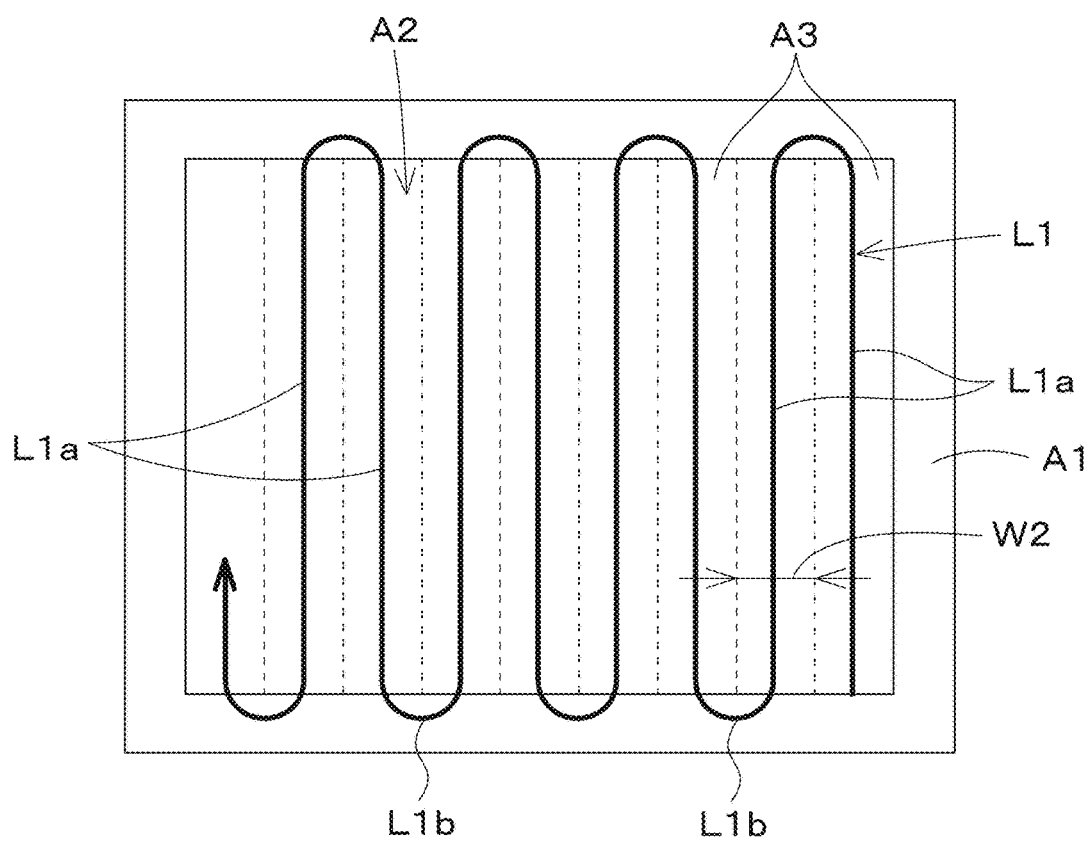
FIG. 8 is an explanatory diagram for explaining creation of a planned traveling route.

As illustrated in FIG. 8, the route creation unit 51B creates, for each unit work section A3 on the agricultural field map MP2, a straight-ahead section (straight-ahead route) L1a on which the traveling vehicle body 3 travels straight ahead. That is, the route creation unit 51B, for example, creates the straight-ahead route L1a having a straight shape and extending between opposite ends in the longitudinal direction of the unit work section A3, that is, extending between opposite sides, in the longitudinal direction of the unit work section A3, of a boundary X1 between the turning area A1 and the work area A2, on a center in the width direction of the unit work section A3. The route creation unit 51B creates a turning section (turning route) L1b connecting ends of straight-ahead routes L1a adjoining each other. That is, the route creation unit 51B creates the turning route L1b at least in the turning area A1.

The route creation unit 51B is capable of associating the planned traveling route L1 with the vehicle speed (moving speed) of the tractor 1 (traveling vehicle body 3). For example, a vehicle speed input portion for inputting the vehicle speed is provided on the route setting screen M3, and the vehicle speed is input to the vehicle speed input portion. The route creation unit 51B associates the straight-ahead route L1a with the vehicle speed input to the vehicle speed input portion. The planned traveling route L1 (the straight-ahead route L1a and the turning route L1b) created by the route creation unit 51B is stored in the storage unit 53.

Figure 9A:
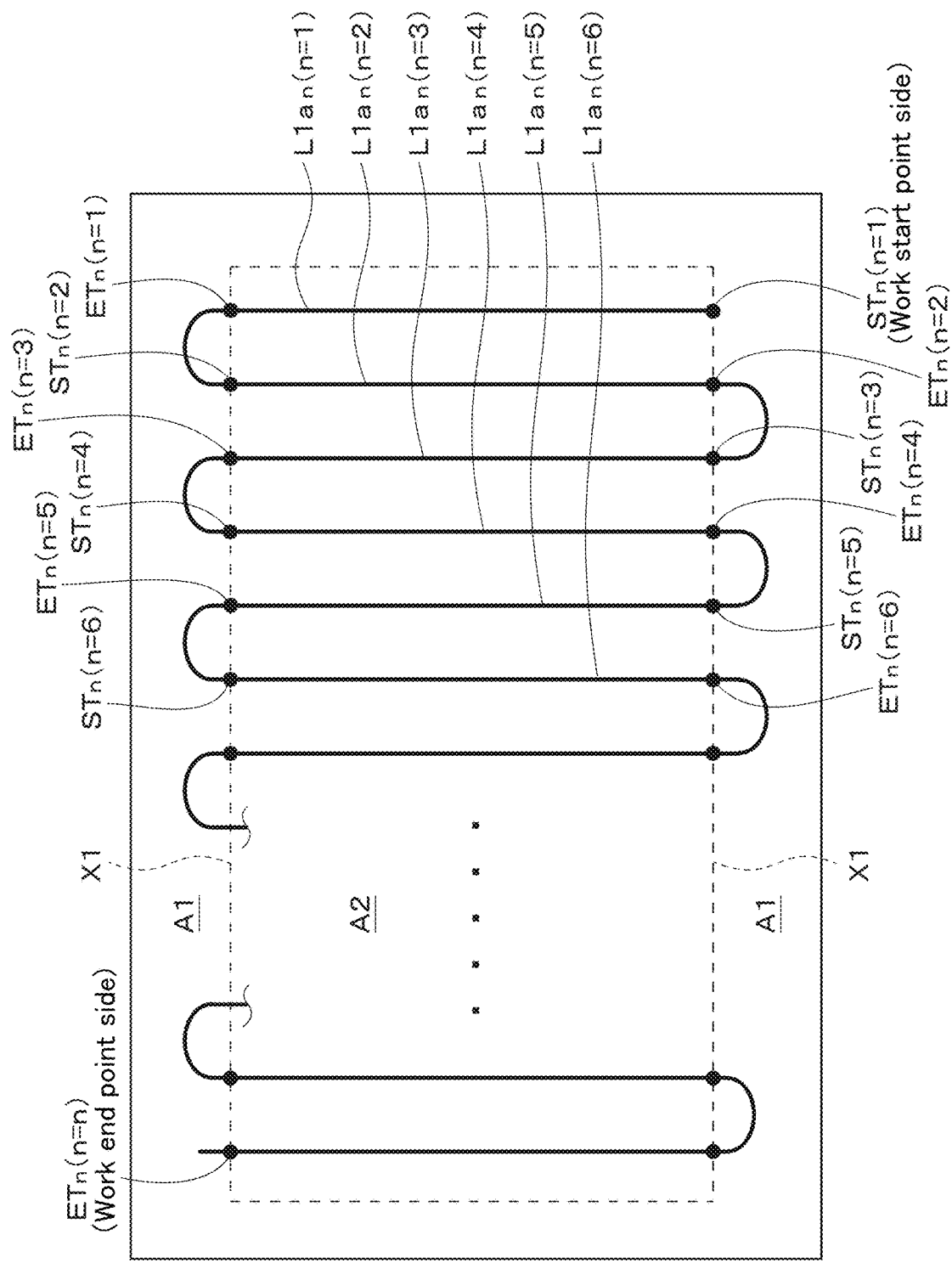
FIG. 9A is a diagram illustrating a state where work start positions and work end positions are aligned along a boundary.

The display device (work assistance apparatus) 50 includes a work setting unit 51H. The work setting unit 51H sets a work start and a work end in the working device 2. As illustrated in FIG. 9A, the work setting unit 51H sets a work start position STn and a work end position ETn at the boundary X1 between the work area A2 and the turning area A1. Alternatively, the work setting unit 51H sets the work start position STn and the work end position ETn on the planned traveling route L1.

Specifically, in a case where the planned traveling route L1 includes straight-ahead routes L1an (n=1, 2, ... n, where the straight-ahead route L1a1 (n=1) is closest to a work start point, and the straight-ahead route L1an (n=n) is closest to a work finish point), as illustrated in FIG. 9A, the work setting unit 51H sets the work start position STn (n=2, 4, 6 ...) at an end on one side (an end on the same side as the work finish point) of the even-numbered straight-ahead route L1an (n=2, 4, 6 ...). The work setting unit 51H sets the work start position STn (n=1, 3, 5 ...) at an end on the other side (an end on the same side as the work start point) of the odd-numbered straight-ahead route L1an (n=1, 3, 5 ...).

The work setting unit 51H sets the work end position ETn (n=1, 3, 5 ...) at an end on the one side (an end on the same side as the work finish point) of the odd-numbered straight-ahead route L1an (n=1, 3, 5 ...). The work setting unit 51H sets the work end position ETn (n=2, 4, 6 ...) at an end on the other side (an end on the same side as the work start point) of the even-numbered straight-ahead route L1an (n=2, 4, 6 ...).

That is, in FIG. 9A, the work start positions STn and the work end positions ETn are aligned along the boundary X1. In other words, at least the work start position STn and the work end position ETn that are adjacent to each other are arranged side by side at the same position in the fore-and-aft direction of the traveling vehicle body 3 (working device 2).

The work setting unit 51H can set the work start position STn and the work end position ETn on the basis of the type of the working device 2. Specifically, in a case where the working device 2 includes a plurality of working parts 101, the work set unit 51H sets the work start position STn and the work end position ETn adjoining each other at different positions in the fore-and-aft direction of the traveling vehicle body 3 (working device 2) according to the plurality of working parts 101.

As illustrated in FIG. 1, the display device (work assistance apparatus) 50 includes an information acquisition unit 51I. The information acquisition unit 51I acquires information about the plurality of working parts 101 included in the working device 2.

Figure 10:
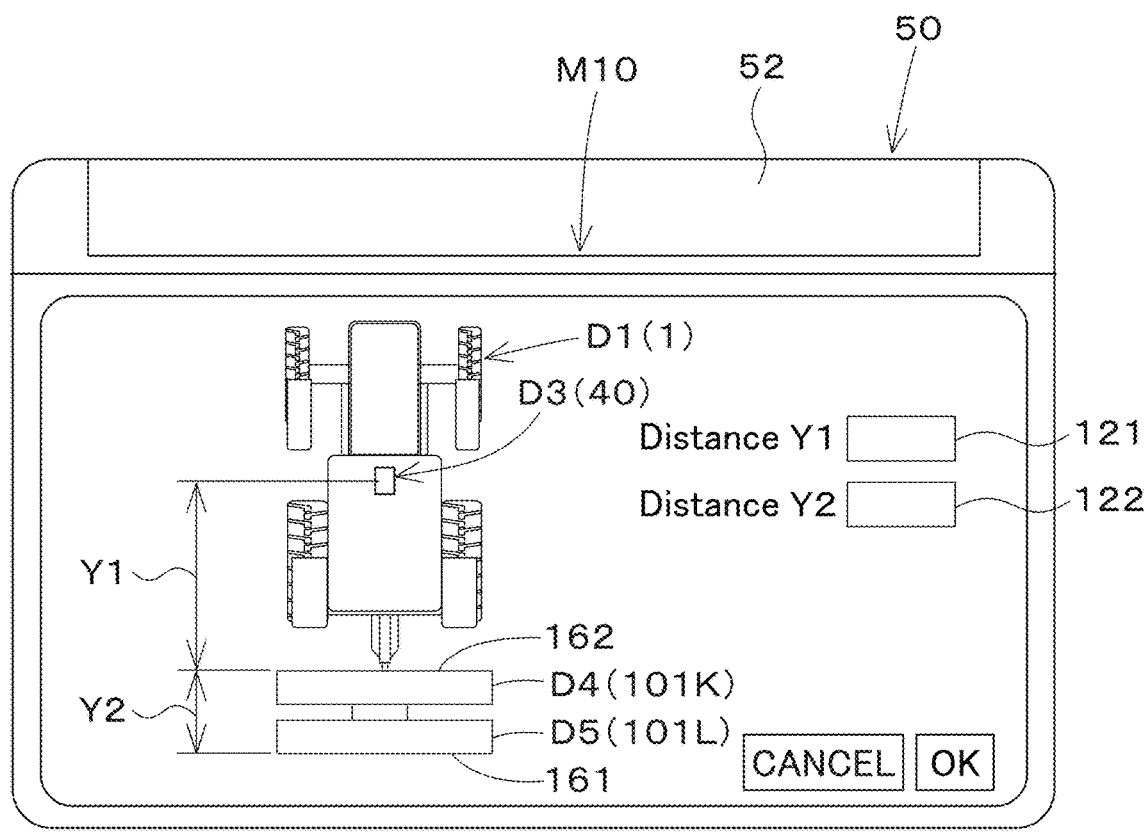
FIG. 10 is a diagram illustrating an example of a machine setting screen.

When a predetermined operation is performed on the display device (work assistance apparatus) 50, as illustrated in FIG. 10, the information acquisition unit 51I displays a machine setting screen M10 for inputting, for example, information of the working parts 101 of the working device 2. The machine setting screen M10 includes a figure D1 representing the tractor (work vehicle) 1, a figure D2 representing the working device 2, a figure D3 representing the positioning device 40, a figure D4 representing the working part 101 on the front side (front working part), and a figure D5 representing the working part 101 on the rear side (rear working part). For convenience of description, among the plurality of working parts 101, the working part 101 located on the front side may be referred to as "front working part 101K", and the working part 101 located on the rear side may be referred to as "rear working part 101L".

The machine setting screen M10 further includes a first input portion 121 for inputting a first distance Y1, and a second input portion 122 for inputting a second distance Y2.

The distance Y1 between the positioning device 40 and the front working part 101K located on the front side of the working device 2 in the fore-and-aft direction (traveling direction) is input to the first input portion 121. The distance Y2 between the front working part 101K and the rear working part 101L located rearward of the front working part 101K is input to the second input portion 122. The information acquisition unit 51I acquires, as the information about the plurality of working parts 101, the distance Y2 between the front working part 101K and the rear working part 101L located rearward of the front working part 101K.

The positioning device 40 or the controller 60 can calculate a position of the front working part 101K (front working part position) from the distance Y1 input to the first input portion 121. Further, the positioning device 40 or the controller 60 can calculate a position of the rear working part 101L (rear working part position) from the distance Y1 input to the first input portion 121 and the distance Y2 input to the second input portion 122. The working device 2 can be raised or lowered or driving of the working device 2 can be started or stopped according to the front working part position and the rear working part position.

In the working device including the plurality of working parts 101 such as the composite device, for example, an operator (driver) selects the front working part 101K and the rear working part 101L at least according to work and inputs the distances Y1 and Y2 respectively to the first input portion 121 and the second input portion 122 as described above according to the work. For example, of the plurality of working parts 101, the first working part 101a and the fifth working part 101e, which are respectively located on the frontmost side and the rearmost side among the working parts capable of stopping work (the first working part 101a, the second working part 101b, and the fifth working part 101e), may be selected as the front working part 101K and the rear working part 101L, respectively. Further, the distance Y1 and the distance Y2 may be respectively input to the first input portion 121 and the second input portion 122 according to the positional relationship between the first working part 101a and the fifth working part 101e.

In the present preferred embodiment, description will be made assuming that, in the composite device illustrated in FIG. 14, the first working part 101a located on the frontmost side among the plurality of working parts 101 is selected as the front working part 101K, and the sixth working part 101f located on the rearmost side among the plurality of working parts 101 is selected as the rear working part 101L.

Although, in the above preferred embodiment, the first distance Y1 between the positioning device 40 and the front working part 101K and the second distance Y2 between the front working part 101K and the rear working part 101L are respectively input to the first input portion 121 and the second input portion 122 on the machine setting screen M10, the present invention is not limited thereto. The position of the positioning device 40, the position of the front working part 101K, and the position of the rear working part 101L may be designated on the machine setting screen M10 using, for example, a pointer, and the work setting unit 51H may obtain the first distance Y1 and the second distance Y2 from the designated positions.

Figure 9B:
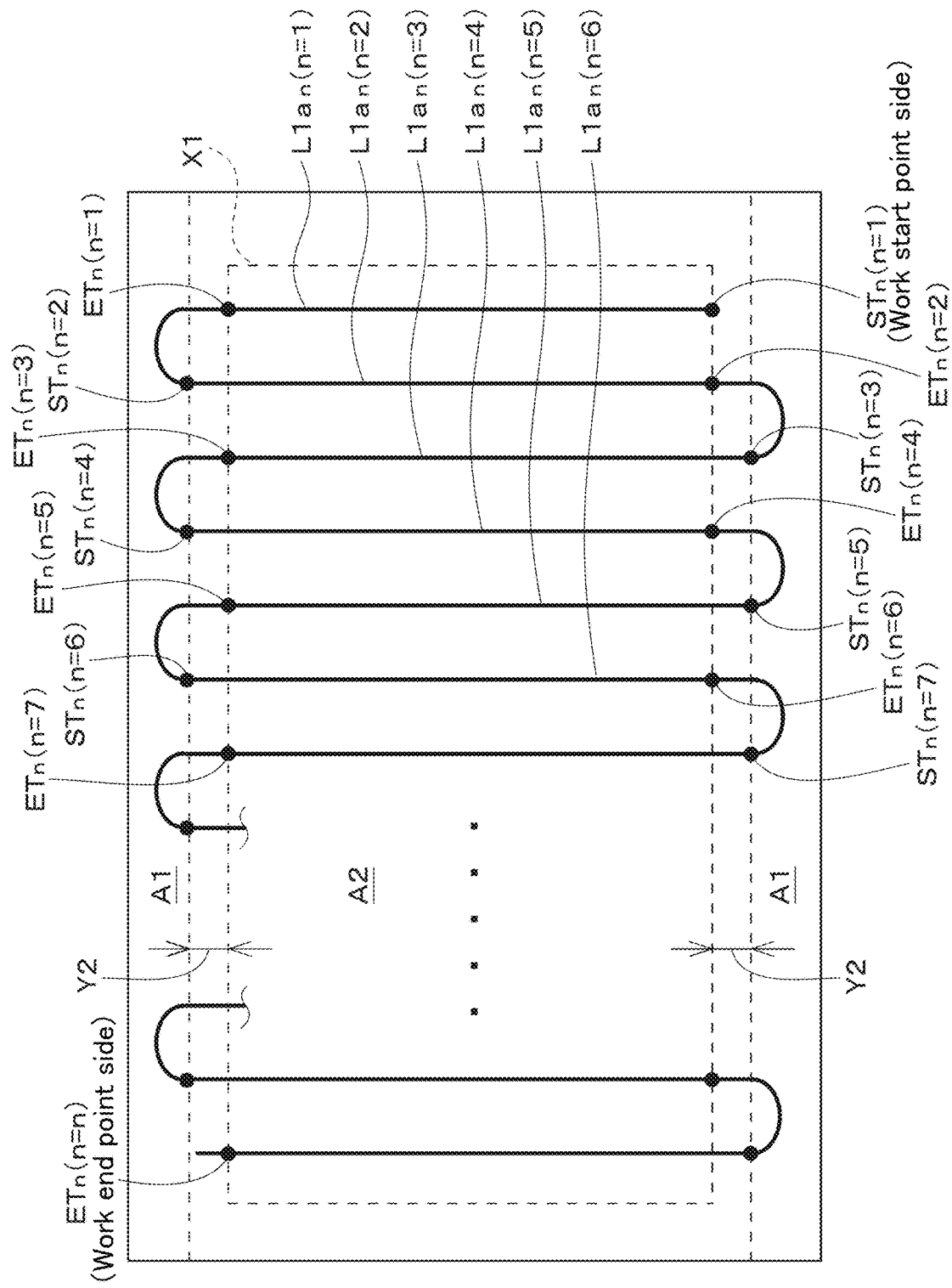
FIG. 9B is a diagram illustrating a state where the work start position and the work end position that are adjacent to each other are offset from each other in a traveling direction.

As illustrated in FIG. 9B, when the information acquisition unit 51I acquires the second distance Y2, the work setting unit 51H sets the work start position STn and the work end position ETn at different positions on the basis of the second distance Y2. The work setting unit 51H shifts the work start position STn (n=2, 4, 6 . . . ) located on the same side as the work finish point illustrated in FIG. 9A to the turning area A1 by at least the second distance Y2. The straight-ahead route L1an (n=2, 4, 6 . . . ) corresponding to the shifted work start position STn (n=2, 4, 6 . . . ) is extended to the shifted work start position STn (n=2, 4, 6 . . . ).

Further, as illustrated in FIG. 9B, the work setting unit 51H shifts the work start position STn (n=3, 5 . . . ) located on the same side as the work start point illustrated in FIG. 9A to the turning area A1 by at least the second distance Y2. The straight-ahead route L1an (n=3, 5, 7 . . . ) corresponding to the shifted work start position STn (n=3, 5, 7 . . . ) is extended to the shifted work start position STn (n=3, 5 . . . ).

That is, the work start position STn and the work end position ETn that are adjacent to each other can be offset from each other in the traveling direction of the working device 2 (the fore-and-aft direction of the working device 2) by the second distance Y2 between the fertilizer spreading nozzle (the first working part 101a) that sprays the fertilizer and the compacting roller (the sixth working part 101f).

In the above preferred embodiment, the work start position STn and the work end position ETn are set on the planned traveling route L1 (straight-ahead route L1an) with the turning area A1 and the working area A2 remaining unchanged. However, as illustrated in FIG. 9C, the work setting unit 51H may shift the work area A2 with the width of the unit work section A3 to the turning area A1 by at least the second distance Y2 and may set the work start position STn and the work end position ETn on the boundary X1 between the work area A2 and the turning area A1.

Next, the automatic operation will be described in detail. As illustrated in FIG. 1, the tractor 1 includes a controller 60. The controller 60 is configured or programmed to control, for example, a traveling system and a work system of the tractor 1. An operation changeover switch 65 is connected to the controller 60. The operation changeover switch 65 is switchable between ON and OFF. The operation changeover switch 65 is capable of setting the controller 60 to an automatic operation mode when the operation changeover switch 65 is ON and capable of setting the controller 60 to a manual operation mode when the operation changeover switch 65 is OFF.

The controller 60 includes an automatic operation control unit 63. The automatic operation control unit 63 may include, for example, an electric or electronic circuit provided on the controller 60 or a program stored in a CPU.

The automatic operation control unit 63 is configured or programmed to control the automatic operation of the traveling vehicle body 3. The automatic operation control unit 63 starts the automatic operation when the controller 60 is in the automatic operation mode. As illustrated in FIG. 11, when a deviation between the vehicle body position and the planned traveling route L1 is smaller than a threshold under the condition where the tractor 1 performs the automatic operation, the automatic operation control unit 63 maintains a rotation angle of the steering shaft (rotation shaft) 31. When the deviation between the vehicle body position and the planned traveling route L1 is equal to or larger than the threshold and the tractor 1 is located leftward of the planned traveling route L1, the automatic operation control unit 63 rotates the steering shaft 31 so that the steering direction of the tractor 1 becomes the rightward direction. When the deviation between the vehicle body position and the planned traveling route L1 is equal to or larger than the threshold and the tractor 1 is located rightward of the planned traveling route L1, the automatic operation control unit 63 rotates the steering shaft 31 so that the steering direction of the tractor 1 becomes the leftward direction. In the above preferred embodiment, the steering angle of the steering device 29 is changed on the basis of the deviation between the vehicle body position and the planned traveling route L1. However, when an azimuth (vehicle body azimuth) of the traveling direction of the tractor 1 (traveling vehicle body 3) differs from an azimuth of the planned traveling route L1, that is, when an angle of the vehicle body azimuth relative to the planned traveling route L1 is equal to or larger than a threshold, the automatic operation control unit 63 may set the steering angle so that the angle becomes zero (the vehicle body azimuth F1 coincides with the azimuth of the planned traveling route L1). The automatic operation control unit 63 may set the final steering angle in the automatic operation on the basis of the steering angle obtained on the basis of the deviation (position deviation) and the steering angle obtained on the basis of the azimuth (azimuth deviation). The setting of the steering angle in the automatic operation in the above preferred embodiment is merely an example, and the setting of the steering angle is not limited thereto.

When the planned traveling route L1 and the vehicle speed are associated with each other, the automatic operation control unit 63 automatically changes, for example, a speed-shift stage of the speed shifter or a rotation speed of the prime mover so that the current vehicle speed of the tractor 1 coincides with a vehicle speed corresponding to the planned traveling route L1.

As illustrated in FIGS. 9B and 9C, when the work start position STn and the work end position ETn are set at different positions in the travelling direction (the fore-and-aft direction of the traveling vehicle body 3), the lifting device 8 raises or lowers the working device 2 on the basis of the work start position STn and the work end position ETn changed by the work setting unit 51H. Further, the automatic operation control unit 63 controls the working device 2 on the basis of the work start position STn and the work end position ETn changed by the work setting unit 51H.

Figure 12A:
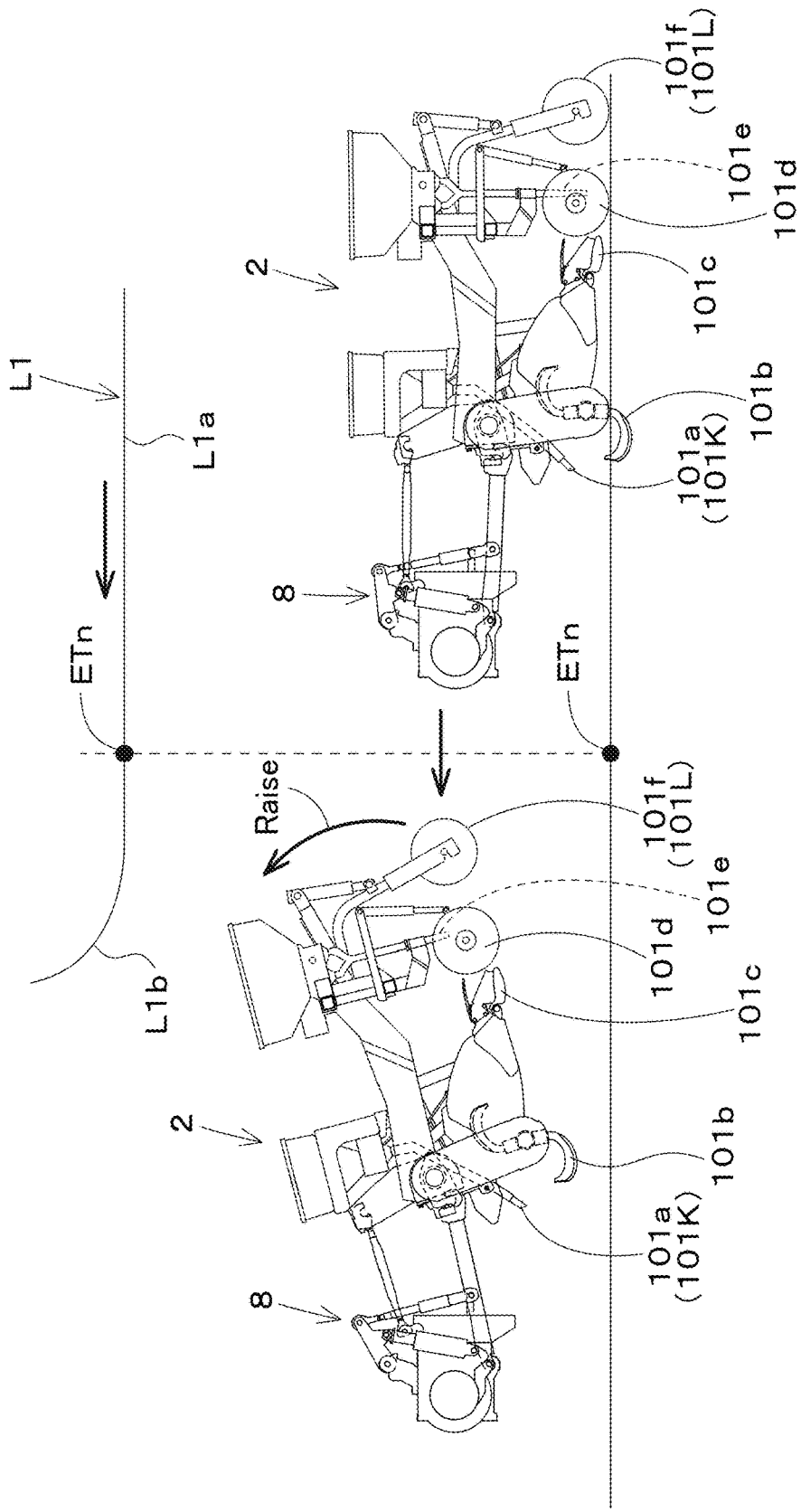
FIG. 12A is a diagram illustrating a state where a working device is raised when a rear working part passes the work end position.

As illustrated in FIG. 12A, the automatic operation control unit 63 causes the lifting device 8 to raise the working device 2 when the working device 2 passes the work end position ETn under the condition where the tractor 1 travels along the straight-ahead route L1*a* by the automatic operation with the working device 2 kept lowered (under the condition where the working device 2 performs the ground work).

Figure 12B:
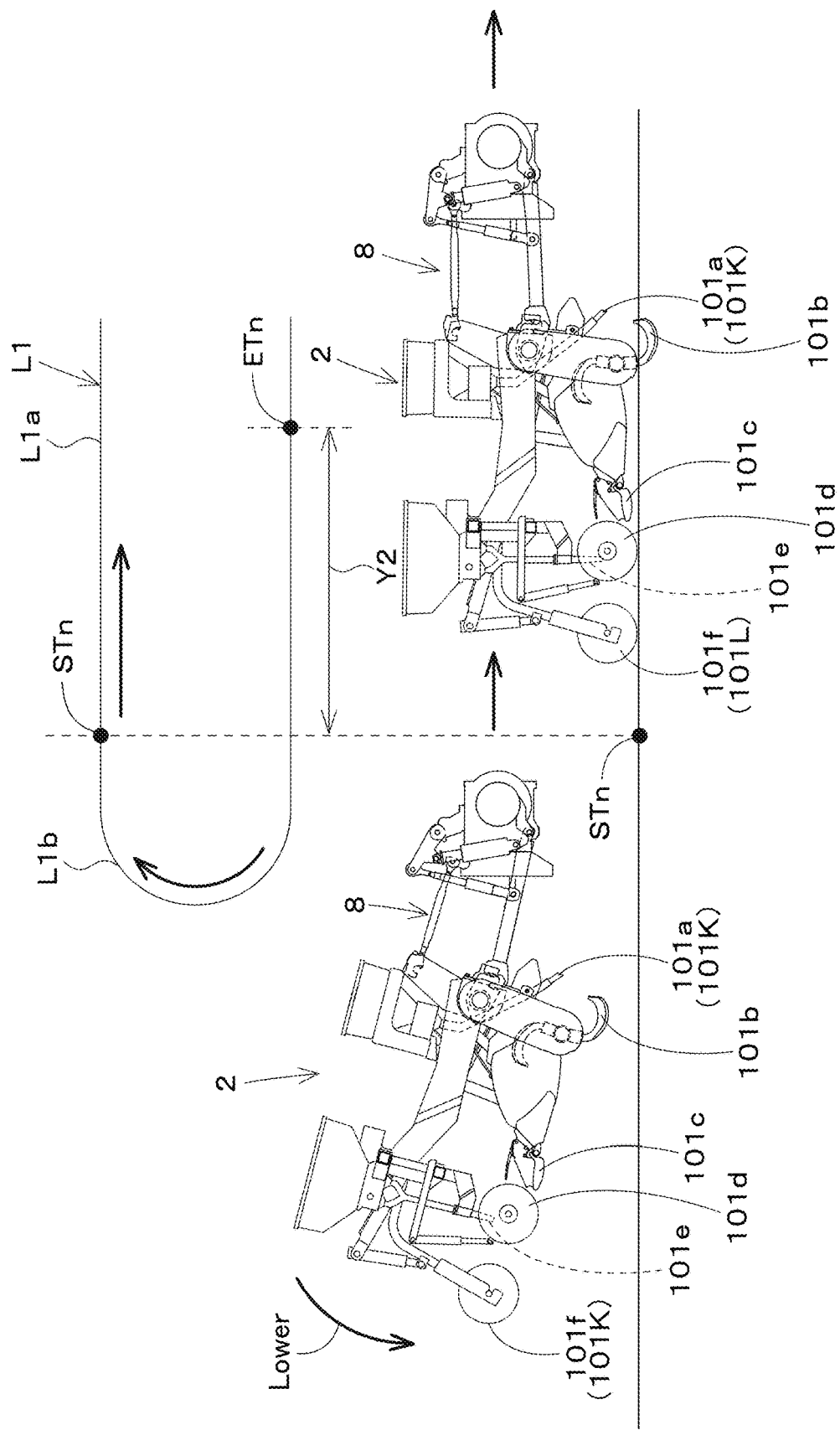
FIG. 12B is a diagram illustrating a state where the working device is lowered when a front working part passes the work start position.

As illustrated in FIG. 12B, the automatic operation control unit 63 causes the lifting device 8 to lower the working device 2 when the working device 2 passes the work start position STn under the condition where the tractor 1 travels at least along the turning route L1*b* by the automatic operation with the working device 2 kept raised. Further, the automatic operation control unit 63 stops driving of the working device 2 when the working device 2 passes the work end position ETn under the condition where the ground work is performed. The automatic operation control unit 63 starts driving of the working device 2 (starts work of the working device 2) when the working device 2 passes the work start position STn under the condition where the tractor 1 travels at least along the turning route L1*b* by the automatic operation.

More specifically, as illustrated in FIG. 12A, the automatic operation control unit 63 outputs a raising signal to the control valve 36 to raise the working device 2 at a point in time when the compacting roller (the sixth working part 101*f*) passes the work end position ETn (when a locus of the rear working part position crosses the work end position ETn) under the condition where the ground work is performed. Further, the automatic operation control unit 63 stops driving of the plurality of driving devices (the feeder 104, the driving mechanism 105, and the feeder 112) provided on the working device 2 at a point in time when the compacting roller (the sixth working part 101*f*) passes the work end position ETn.

The automatic operation control unit 63 may stop driving of the plurality of driving devices (the feeder 104, the driving mechanism 105, and the feeder 112) by outputting a stop signal to each of the driving devices or may stop the plurality of driving devices by switching a PTO clutch 125, the PTO clutch 125 being switchable between an engaged state where power of a PTO shaft is transmitted to the working device 2 and a disengaged state where power of the PTO shaft is not transmitted to the working device 2, from the engaged state to the disengaged state.

As illustrated in FIG. 12B, the automatic operation control unit 63 lowers the working device 2 at a point in time when the fertilizer spreading nozzle (the first working part 101*a*) passes the work start position STn (when a locus of the front working device position crosses the work start position STn) in traveling from the turning route L1*b* to the straight-ahead route L1*a*. Further, the automatic operation control unit 63 outputs a driving signal to the feeder 104 and the driving mechanism 105 to drive the feeder 104, thus starting tilling and fertilizer spreading, at a point in time when the fertilizer spreading nozzle (the first working device 101*a*) passes the work start position STn in traveling from the turning route L1*b* to the straight-ahead route L1*a*.

The automatic operation control unit 63 outputs a driving signal to the feeder 112 to drive the feeder 112, thus starting work relating to the compacting roller (the sixth working part 101*f*), that is, starting seeding through the seeding nozzle, at a point in time when the fertilizer spreading nozzle (the first working device 101*a*) advances a predetermined distance after passing the work start position STn, for example, at a point in time when the fertilizer spreading nozzle advances less than the second distance Y2 from the work start position STn.

The automatic operation control unit 63 may monitor the distance between the rear working part position and the work end position ETn during the automatic operation and may perform control taking the responsivity of the lifting device 8 into consideration so that the raising of the working device 2 is actually started when the rear working part 101L reaches the work end position ETn. Similarly, the automatic operation control unit 63 may monitor the distance between the front working part position and the work start position STn during the automatic operation and may perform control taking the responsivity of the lifting device 8 into consideration so that the lowering of the working device 2 is actually completed when the front working part 101K reaches the work start position STn.

The above preferred embodiment describes the composite device including the plurality of working parts 101*a* to 101*f*. However, in a case where the composite device includes at least two working devices (the fertilizer spreader and the seeder) as described above, one working device (the fertilizer spreader) and the other working device (the seeder) may be regarded as working parts. In this preferred embodiment, "fertilizer spreader 101K" corresponds to the front working part 101K, and "seeder 101L" corresponds to the rear working part 101L, for example.

Hereinbelow, the case where the front working part 101K is the fertilizer spreader 101K, and the rear working part 101L is the seeder 101L will be described.

As illustrated in FIG. 10, the first distance Y1 between the positioning device 40 and a front end 162 of the fertilizer spreader 101K is input to the first input portion 121 of the machine setting screen M10. The second distance Y2 between the front end 162 of the fertilizer spreader 101K and a rear end 161 of the seeder 101L is input to the second input portion 122.

The work setting unit 51H sets the work start position STn and the work end position ETn on the basis of the second distance Y2 using the method described above.

Figure 13A:
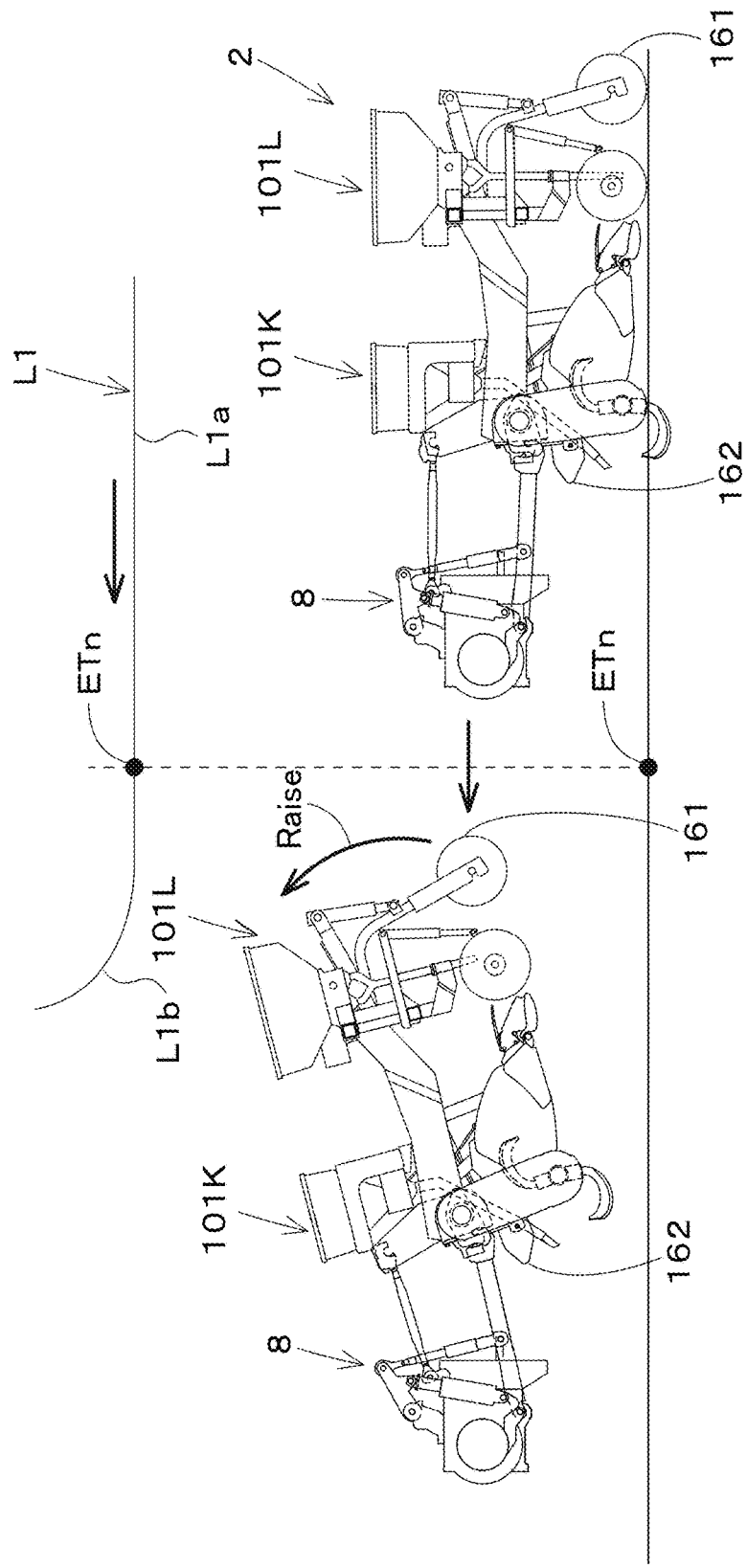
FIG. 13A is a diagram illustrating a state where the working device is raised in a case where the front working part is a fertilizer spreader and the rear working part is a seeder.
Figure 13B:
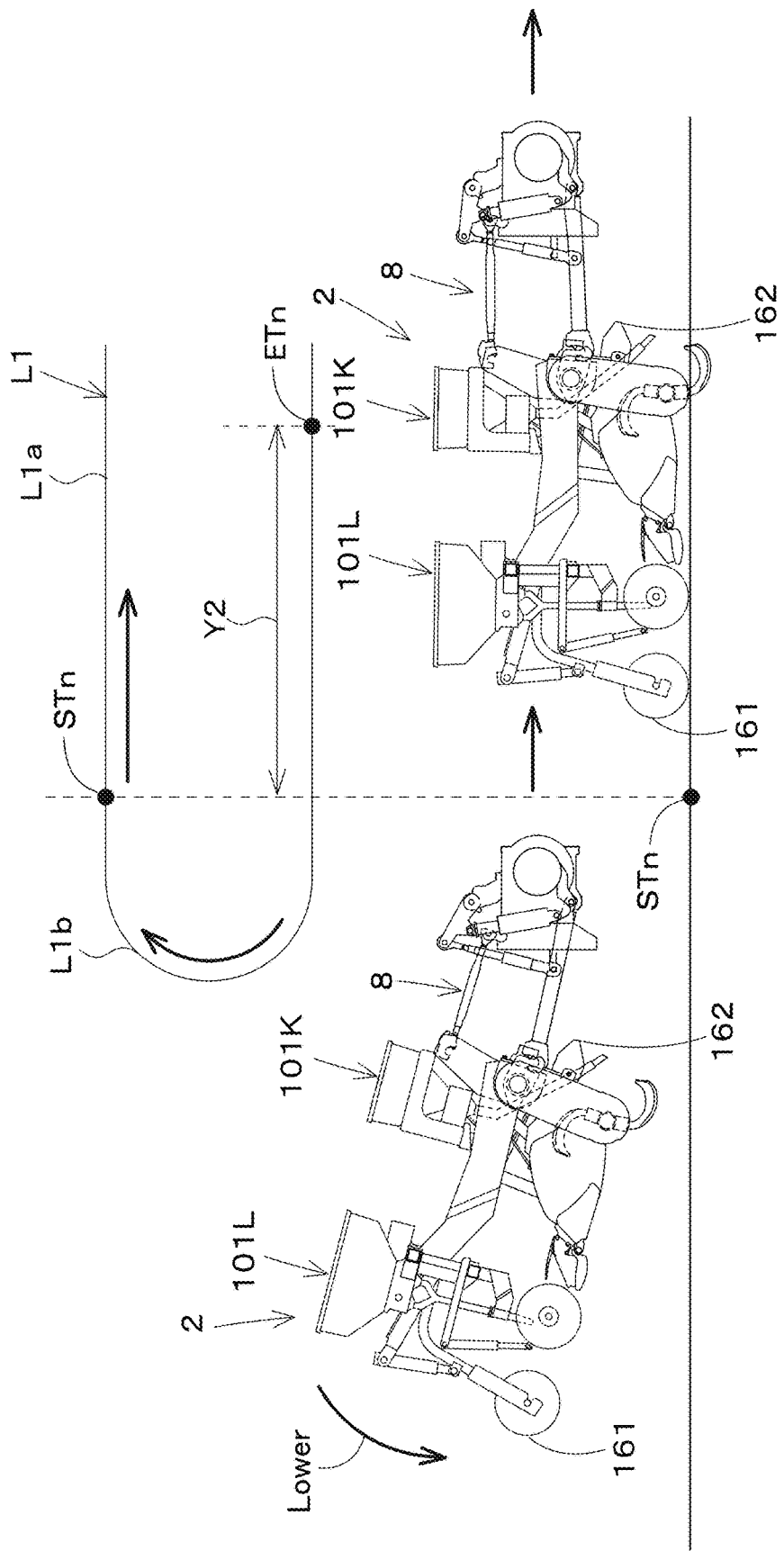
FIG. 13B is a diagram illustrating a state where the working device is lowered in the case where the front working part is the fertilizer spreader and the rear working part is the seeder.

As illustrated in FIG. 13A, the automatic operation control unit 63 causes the lifting device 8 to raise the fertilizer spreader 101K and the seeder 101L when the rear end 161 of the seeder 101L passes the work end position ETn under the condition where the tractor 1 travels along the straight-ahead route L1*a* by the automatic operation with the fertilizer spreader 101K and the seeder 101L kept lowered (under the condition where the ground work is performed). As illustrated in FIG. 13B, the automatic operation control unit 63 causes the lifting device 8 to lower the fertilizer spreader 101K and the seeder 101L when the front end 162 of the fertilizer spreader 101K passes the work start position STn under the condition where the tractor 1 travels at least along the turning route L1*b* by the automatic operation with the working device 2 kept raised. Further, the automatic operation control unit 63 stops driving of the fertilizer spreader 101K and the seeder 101L when the rear end of the seeder 101L passes the work end position ETn under the condition where the ground work is performed. The automatic operation control unit 63 starts driving of the fertilizer spreader 101K (starts work of the fertilizer spreader 101K) when the front end 162 of the fertilizer spreader 101K passes the work start position STn under the condition where the tractor 1 travels at least along the turning route L1*b* by the automatic operation.

The automatic operation control unit 63 drives the seeder 101L at a point in time when the front end 162 of the fertilizer spreader 101K advances a predetermined distance after passing the work start position STn, for example, at a point in time when the front end 162 of the fertilizer spreader 101K advances less than the second distance Y2 from the work start position STn.

The work vehicle 1 includes the traveling vehicle body 3, the coupling device capable of coupling the working device 2 to the traveling vehicle body 3, the working device 2 including the plurality of working parts 101 to the traveling vehicle body 3, the automatic operation control unit 63 that automatically operates the traveling vehicle body 3 on the basis of the planned traveling route L1, and the work setting unit 51H that sets the work start position STn and the work end position ETn for the working device 2 at different positions on the basis of the plurality of working parts 101.

According to this configuration, the work start position STn and the work end position ETn can be set at different positions. Thus, for example, even if the working device 2 is long in the fore-and-aft direction and the working parts 101 are thus apart from each other, it is possible to reduce the possibility of presence of a place where at least one of the working parts 101 has not performed work (unworked place). That is, even when the work vehicle 1 performs work using the working device including the plurality of working parts 101 while traveling, the work can be accurately performed at an intended location.

The work vehicle 1 includes the area setting unit 51D that sets the work area A2 where the working device 2 performs work and the turning area A1 where the traveling vehicle body 3 is turned around. The work setting unit 51D sets the work start position STn and the work end position ETn at the boundary X1 between the work area A2 and the turning area A1. This enables the plurality of working parts 101 to start work on the boundary X1 and to end work on the boundary X1 as accurately as possible.

The work vehicle 1 includes the route creation unit 51B that creates the planned traveling route L1 for the traveling vehicle body 3. The work setting unit 51H sets the work start position STn and the work end position ETn for the working device 2 on the planned traveling route L1 on the basis of the plurality of working parts 101. This makes it easy to perform the traveling of the tractor 1 (working device 2) on the planned traveling route L1 set by the route creation unit 51B in conjunction with the work start at the work start position STn and the work end at the work end position ETn. Thus, the automatic operation can be efficiently performed.

The work setting unit 51H sets the work end position ETn according to the position of the rear working part 101L that is the working part 101 located on the rear side among the plurality of working parts 101. This enables, among the plurality of working parts 101, the rear working part 101L to perform work up to the work end position ETn set by the work setting unit 51H.

The work setting unit 51H sets the work start position STn according to the position of the front working part 101K that is the working part 101 located on the front side among the plurality of working parts 101. This enables, among the plurality of working parts 101, the front working part 101K to start work at the work start position STn set by the work setting unit 51H.

The coupling device is the lifting device 8 that raises and lowers the working device 2, and raises and lowers the working device 2 on the basis of the work start position STn and the work end position ETn changed by the work setting unit 51H. Accordingly, the lifting device 8 can stably raise and lower the working device 2 even when the work start position STn and the work end positions ETn are set at different positions.

The coupling device raises the working device 2 when the working device 2 passes the work end position ETn and lowers the working device 2 when the working device 2 passes the work start position STn. Accordingly, the work can be ended by raising the working device 2 at the work end position ETn, and the work can be started by lowering the working device 2 at the work start position STn.

The work vehicle 1 includes the controller 60 that controls the working device 2 on the basis of the work start position STn and the work end position ETn changed by the work setting unit 51H. Accordingly, the controller 60 can stably start and end the work of the working device 2.

The controller 60 stops work of the rear working part 101L that is the working part 101 located on the rear side among the plurality of working parts 101 when the rear working part 101L passes the work end position ETn. Accordingly, when the tractor 1 (working device 2) advances beyond the work end position ETn, the position where the rear working part 101L ends the work can be made as constant as possible.

The controller 60 starts work of the front working part 101K that is the working part 101 located on the front side among the plurality of working parts 101 when the front working part 101K passes the work start position STn. Accordingly, in a case where the plurality of working parts 101 are present, a changeover to work performed after the work of the front working part 101K can be smoothly performed by starting the work of the front working part 101K prior to the work of the rear working part 101L.

The work setting unit 51H sets the work start position STn according to the position of the front working part 101K that is the working part 101 located on the front side among the plurality of working parts 101 and sets the work end position ETn according to the position of the rear working part 101L that is the working part 101 located on the rear side among the plurality of working parts 101. The controller 60 starts work of the rear working part 101L at a point in time when the traveling vehicle body 3 advances a predetermined distance after the front working part 101K starts work at the work start position STn. Accordingly, in a case where the working device 2 incudes the front working part 101K and the rear working part 101L, a changeover to the work of the rear working part 101L can be performed after the work of the front working part 101K is performed. In addition, it is possible to reduce waste caused by the work of the rear working part 101L starting too early.

The plurality of working parts 101 perform different types of work on the ground. Accordingly, various types of work can be efficiently performed in a combined manner.

The work assistance apparatus for the work vehicle 1 includes the information acquisition unit 51I that acquires information about the plurality of working parts 101 included in the working device 2 coupled to the traveling vehicle body 3, and the work setting unit 51H that sets the work start position STn and the work end position ETn for the working device 2 at different positions on the basis of the information about the plurality of working parts 101 acquired by the information acquisition unit 51I. Accordingly, the work start position STn and the work end position ETn can be set at different positions. Thus, for example, even if a length of the working device 2 extends in the fore-and-aft direction and the working parts 101 are thus spaced apart from each other, it is possible to reduce the possibility of presence of a place where at least one of the working parts 101 has not performed work (unworked place). That is, even when the work vehicle 1 performs work using the working device including the plurality of working parts 101 while traveling, the work can be accurately performed at an intended location.

The work assistance apparatus for the work vehicle 1 includes the area setting unit 51D that sets the work area A2 where the working device 2 performs work and the turning area A1 where the traveling vehicle body 3 is turned around. The work setting unit 51H sets the work start position STn and the work end position ETn at the boundary X1 between the work area A2 and the turning area A1. This enables the plurality of working parts 101 to start work on the boundary X1 and to end work on the boundary X1 as accurately as possible.

The work assistance apparatus for the work vehicle 1 includes the route creation unit 51B that creates the planned traveling route L1 for the traveling vehicle body 3. The work setting unit 51H sets the work start position STn and the work end position ETn for the working device 2 on the planned traveling route L1 on the basis of the plurality of working parts 101. This makes it easy to perform the traveling of the tractor 1 (working device 2) on the planned traveling route L1 set by the route creation unit 51B in conjunction with the work start at the work start position STn and the work end at the work end position ETn. Thus, the automatic operation can be efficiently performed.

The above preferred embodiment describes the automatic operation that causes the tractor 1 (traveling vehicle body 3) to travel while changing the vehicle speed along the planned traveling route. However, the automatic operation also includes automatic steering that automatically performs only steering of the tractor 1 (traveling vehicle body 3) along the planned traveling route and automatic steering in which, after a traveling reference route for creating a planned traveling route is registered, a driver operates a switch to cause the tractor 1 to travel along the planned traveling route parallel to the traveling reference route in any manner.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle comprising:
 a traveling vehicle body;
 a lifter capable of coupling a working device to the traveling vehicle body, the working device including a front working implement and a rear working implement disposed behind the front working implement by a predetermined distance;
 a working device controller including an automatic operation controller configured or programmed to automatically operate the traveling vehicle body based on a planned traveling route and to raise or lower the lifter; and
 a work setting controller configured or programmed to set a work start position and a work end position for the working device; wherein
 the working device controller is configured or programmed to, when the automatic operation controller automatically operates the traveling vehicle body, start raising the lifter when the rear working implement reaches the work end position and complete lowering the lifter when the front working implement reaches the work start position.

2. The work vehicle according to claim 1, further comprising an area setting controller configured or programmed to set a work area where the working device performs work and a turning area where the traveling vehicle body turns; wherein
 the work setting controller is configured or programmed to set the work start position and the work end position at a boundary between the work area and the turning area.

3. The work vehicle according to claim 1, further comprising a route creator configured or programmed to create the planned traveling route for the traveling vehicle body; wherein
 the work setting controller is configured or programmed to set the work start position and the work end position for the working device on the planned traveling route based on positions of the front working implement and the rear working implement.

4. The work vehicle according to claim 1, wherein the working device controller is configured or programmed to stop work by use of the rear working implement when the rear working implement passes the work end position.

5. The work vehicle according to claim 1, wherein the working device controller is configured or programmed to start work by use of the front working implement when the front working implement passes the work start position.

6. The work vehicle according to claim 1, wherein the front working implement and the rear working implement perform different types of work on the ground.

7. The work vehicle according to claim 1, wherein
 after the working device controller starts first work by use of the front working implement at the work start position and the automatic operation controller automatically operates the traveling vehicle body to advance the predetermined distance, the working device controller starts second work by use of the rear working implement.

8. The work vehicle according to claim 1, further comprising an information acquirer configured or programmed to allow an operator to input the predetermined distance.

9. The work vehicle according to claim 1, wherein the work start position and the work end position are arranged side by side.

10. A work assistance apparatus for a work vehicle, the work assistance apparatus comprising:
   an information acquirer configured or programmed to acquire information about a predetermined distance between a front working implement and a rear working implement disposed behind the front working implement, the front working implement and the rear working implement being included in a working device coupled to a traveling vehicle body through a lifter; and
   a work setting controller configured or programmed to set a work start position and a work end position for the working device; wherein
   when the traveling vehicle body automatically operates, the lifter is controlled to start raising when the rear working implement reaches the work end position and complete lowering when the front working implement reaches the work start position.

11. The work assistance apparatus for a work vehicle according to claim 10, further comprising an area setting controller configured or programmed to set a work area where the working device performs work and a turning area where the traveling vehicle body turns; wherein
   the work setting controller is configured or programmed to set the work start position and the work end position at a boundary between the work area and the turning area.

12. The work assistance apparatus for a work vehicle according to claim 10, further comprising a route creator configured or programmed to create a planned traveling route for the traveling vehicle body; wherein
   the work setting controller is configured or programmed to set the work start position and the work end position for the working device on the planned traveling route based on the information about positions of the front working implement and the rear working implement.

13. The work assistance apparatus according to claim 10, wherein
   after the front working implement starts first work at the work start position and the traveling vehicle body automatically advances the predetermined distance, the rear working implement starts second work.

14. The work assistance apparatus according to claim 10, wherein the information acquirer is configured or programmed to allow an operator to input the predetermined distance.

15. The work assistance apparatus according to claim 10, wherein the work start position and the work end position are arranged side by side.

16. A work vehicle comprising:
   a traveling vehicle body;
   a lifter capable of coupling a working device to the traveling vehicle body, the working device including a front working implement and a rear working implement disposed behind the front working implement by a predetermined distance;
   a working device controller including an automatic operation controller configured or programmed to automatically operate the traveling vehicle body based on a planned traveling route and to raise or lower the lifter; and
   a work setting controller configured or programmed to set a work start position and a work end position for the working device, wherein
   the working device controller is configured or programmed to lower the lifter before the front working implement reaches the work start position, start first work by use of the front working implement at the work start position, automatically operate the traveling vehicle body to advance the predetermined distance, and start second work by use of the rear working implement.

17. The work vehicle according to claim 16, wherein
   the working device controller is configured or programmed to stop the first work by use of the front working implement at the work end position, automatically operate the traveling vehicle body to advance the predetermined distance, stop the second work by use of the rear working implement, and raise the lifter after the rear working implement reaches beyond the work end position.

18. The work vehicle according to claim 16, further comprising an information acquirer configured or programmed to allow an operator to input the predetermined distance.

* * * * *